US010937085B2

(12) United States Patent
Laskowitz et al.

(10) Patent No.: US 10,937,085 B2
(45) Date of Patent: Mar. 2, 2021

(54) DISPLAY SYSTEM FOR SMART PRODUCTS

(71) Applicant: Target Brands, Inc., Minneapolis, MN (US)

(72) Inventors: Adam M. Laskowitz, San Francisco, CA (US); Patricia S. Adler, Oakland, CA (US); Jacob A. Barton, New York, NY (US); Nathan G. Adkisson, New York, NY (US); Paul A. Hoppe, Brooklyn, NY (US); Philipp Rockel, Brooklyn, NY (US); John D. Ryan, Brooklyn, NY (US); Nico Guillin, Beacon, NY (US)

(73) Assignee: Target Brands, Inc., Minneapolis, MN (US)

(*) Notice: Subject to any disclaimer, the term of this patent is extended or adjusted under 35 U.S.C. 154(b) by 108 days.

(21) Appl. No.: 16/378,854

(22) Filed: Apr. 9, 2019

(65) Prior Publication Data
US 2019/0250774 A1 Aug. 15, 2019

Related U.S. Application Data

(63) Continuation of application No. 15/161,645, filed on May 23, 2016, now Pat. No. 10,303,329.

(51) Int. Cl.
G06Q 30/06 (2012.01)
G06F 3/0482 (2013.01)
(Continued)

(52) U.S. Cl.
CPC ....... G06Q 30/0643 (2013.01); G06F 3/0482 (2013.01); G06F 3/0487 (2013.01);
(Continued)

(58) Field of Classification Search
CPC ................. G06Q 30/0641; G06Q 30/0643
See application file for complete search history.

(56) References Cited

U.S. PATENT DOCUMENTS 5,646,602 A 7/1997 Gertz et al.
6,236,435 B1 5/2001 Gertz
(Continued)

OTHER PUBLICATIONS

Michael Wittwer, Travel Map Animation [Free After Effects Template], Sep. 6, 2014, captured image from https://www.youtube.com/watch?v=rs8Djcf8NAU, 1 page (Year: 2014).*
(Continued)

Primary Examiner — Scott T Baderman
Assistant Examiner — Seung Woon Jung
(74) Attorney, Agent, or Firm — Leanne Taveggia Farrell; Westman, Champlin & Koehler, P.A.

(57) ABSTRACT

A display system includes a plurality of smart products arranged in a physical display setting in a retail store and being available for purchased by a customer, a display screen located behind the plurality of smart products, an input device and a controller coupled to the input device and to the display screen. The controller is configured to receive an indication from the input device to instruct digital media content to be displayed on the display screen. The digital media content includes a sequence of frames of digital images that describe information related to functional features of at least a first smart product and a second smart product on physical display in front of the display screen including the functional features of how the first smart product is interconnected to the second smart product so that the first smart product prompts the second smart product to perform a function.

19 Claims, 16 Drawing Sheets

(51) Int. Cl.
*G06F 3/0487* (2013.01)
*G06F 9/451* (2018.01)
*H04L 12/28* (2006.01)

(52) U.S. Cl.
CPC ......... *G06F 9/451* (2018.02); *G06Q 30/0641* (2013.01); *H04L 12/282* (2013.01)

(56) References Cited

U.S. PATENT DOCUMENTS

| | | | |
|---|---|---|---|
| 7,555,615 | B2 | 6/2009 | Landvik |
| 7,701,339 | B2 | 4/2010 | Irmscher et al. |
| 7,979,374 | B2 | 7/2011 | Landvik |
| 8,994,798 | B2 | 3/2015 | Trinh et al. |
| 2002/0054027 | A1 | 5/2002 | Porter et al. |
| 2004/0073931 | A1 | 4/2004 | Trussell, Jr. et al. |
| 2004/0255524 | A1 | 12/2004 | Belini et al. |
| 2007/0229259 | A1* | 10/2007 | Irmscher ............ G06Q 30/0281 340/568.2 |
| 2008/0165082 | A1* | 7/2008 | Manico ................. G06F 3/1446 345/1.3 |
| 2010/0017744 | A1 | 1/2010 | Kikuchi et al. |
| 2012/0078502 | A1* | 3/2012 | Bolin ................... G01C 21/367 701/409 |
| 2013/0091749 | A1* | 4/2013 | Glickfield ............. G09F 23/06 40/606.01 |
| 2016/0104231 | A1 | 4/2016 | Taylor et al. |

OTHER PUBLICATIONS

PieterExplainsTech, How Network Address Translation Works, a YouTube video captured at https://www.youtube.com/watch?v=QBqPzHEDzvo, Dec. 4, 2012, 11 pages (Year: 2012).*
Heather Kelly, Helping 'smart' devices talk to each other, Mar. 28, 2014, CNN, 5 pages (Year: 2014).*
Retail Merchandising Blog, "How to Create Customer Dreams in Your Store", http://merchandisingblog.inspire.ca/how-to-create-customer-dreams-in-your-store/, at least as early as Feb. 18, 2016, 6 pages.

* cited by examiner

DISPLAY SYSTEM FOR SMART PRODUCTS

CROSS-REFERENCE TO RELATED APPLICATIONS

The present application is a continuation of and claims priority to U.S. patent application Ser. No. 15/161,645, filed May 23, 2016, the contents of which is hereby incorporated by reference in its entirety.

BACKGROUND

The Internet of Things (IoT) is a network of smart products where each smart product is embedded with electronics, software, sensors and network connectivity, which enables these products to collect and exchange data. Smart products can be sensed and controlled remotely across existing network infrastructure, creating opportunities for the integration of the physical world with computing systems and resulting in improved efficiency, accuracy and economic benefit.

The discussion above is merely provided for general background information and is not intended to be used as an aid in determining the scope of the claimed subject matter.

SUMMARY

A display system includes an input device, a display screen located in a retail store and behind a plurality of smart products that are on physical display and a processor. Each smart product is positioned relative to and adjacent a set location on the display screen and is available for purchase. The processor is coupled to the input device and is configured to receive an indication from the input device to instruct the display screen to play digital media content. The digital media content includes a sequence of frames of digital images including frames of a first text balloon rendered near a first location on the display screen that corresponds with the set location of a first smart product, frames of a line that extends from the first location to a second location on the display screen that corresponds with the set location of a second smart product and frames of a second text balloon rendered near the second location on the display screen. The first text balloon describes information related to functions of the first smart product and the second text balloon describes information related to functions of the second smart product. The line illustrates that the information related to functions described in the first text balloon that corresponds to the first smart product are configured to trigger the information related to functions described in the second text balloon that corresponds to the second smart product.

A display system includes a plurality of smart products arranged in a physical display setting in a retail store and being available for purchased by a customer, a display screen separate from the plurality of smart products and located behind the plurality of smart products, an input device located in the physical display setting with the plurality of smart products and the display screen and a controller coupled to the input device and to the display screen. The controller is configured to receive an indication from the input device to instruct digital media content to be displayed on the display screen. The digital media content includes a sequence of frames of digital images that describe information related to functional features of at least a first smart product and a second smart product on physical display in front of the display screen including the functional features of how the first smart product is interconnected to the second smart product so that the first smart product prompts the second smart product to perform a function.

A method of displaying media content on a display screen includes receiving, by a processor, an indication from an input device to instruct the display screen to play digital media content and instructing, by the processor, that the digital media content be played on the display screen located in a retail store and behind a plurality of smart products that are on physical display in the retail store. The digital media content includes a sequence of frames of digital images including frames of a first text balloon rendered near a first location on the display screen that corresponds with a set location of a first smart product, frames of a line that extends from the first location to a second location on the display screen that corresponds with a set location of a second smart product and frames of a second text balloon rendered near the second location on the display screen. The first text balloon describes information related to functions of the first smart product and the second text balloon describes information related to functions of the second smart product. The line illustrates that the described functions in the first text balloon that correspond to the first smart product are configured to trigger the described functions in the second text balloon that correspond to the second smart product.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 3-1 illustrates an exemplary graphical user interface from an input device of a display system according to one embodiment.

FIG. 3-2 through 3-6 illustrate front views of a display setting taken at respective times during the run time of a selected one of a plurality of scenes or vignettes according to one embodiment.

FIG. 4 is a schematic block diagram illustrating the components of a display system according to one embodiment.

FIG. 5 is a flow diagram illustrating a method of displaying digital media content on a display screen according to one embodiment.

FIG. 6-1 illustrates an exemplary graphical user interface from an input device of a display system according to one embodiment.

FIGS. 6-2 through 6-6 illustrate front perspective views of a display setting taken at respective times during the run time of a selected one of a plurality of scenes or vignettes according to one embodiment.

FIG. 7-1 illustrates an exemplary graphical user interface from an input device of a display system according to one embodiment.

FIGS. 7-2 through 7-11 illustrate front perspective views of a display setting taken at respective times during the run

DETAILED DESCRIPTION

Displaying smart products, such as home related and connected home related products, to customers in a retail setting is challenging. Oftentimes these products are not fully understood when relying on packaging design alone. Embodiments of a display system and method of displaying digital media content on a display screen are provided that both display smart products and convey associated marketing information as described herein. The display system allows customers to be educated on a plurality of different smart products as well as experience the different smart products within a scene or vignette environment.

The display system includes a display screen located behind a plurality of smart products that are on display, an input device including a graphical user interface with a plurality of selectable scenes or vignettes and a processor or controller. In one embodiment, a scene or vignette is selected and digital media content having a sequence of frames of digital images that is associated with the selected scene or vignette is played on the display screen. In one embodiment, the sequence of frames of digital images of the selected scene or vignette include frames that produce a halo of light behind a smart product being described in the frames. In another embodiment, during the run time of the selected scene or vignette, the processor accesses timing instructions or controller dispatches at least one action to a particular smart product at a respective time to activate or deactivate a tangible function of the particular smart product. Such tangible functions are those functions perceived by the senses, such as sound being perceived by the ear or visible functions being perceived by the eye. An exemplary visible function includes a light or lights on the product itself, a light or lights associated with a display or switch on the product.

Figure 1:
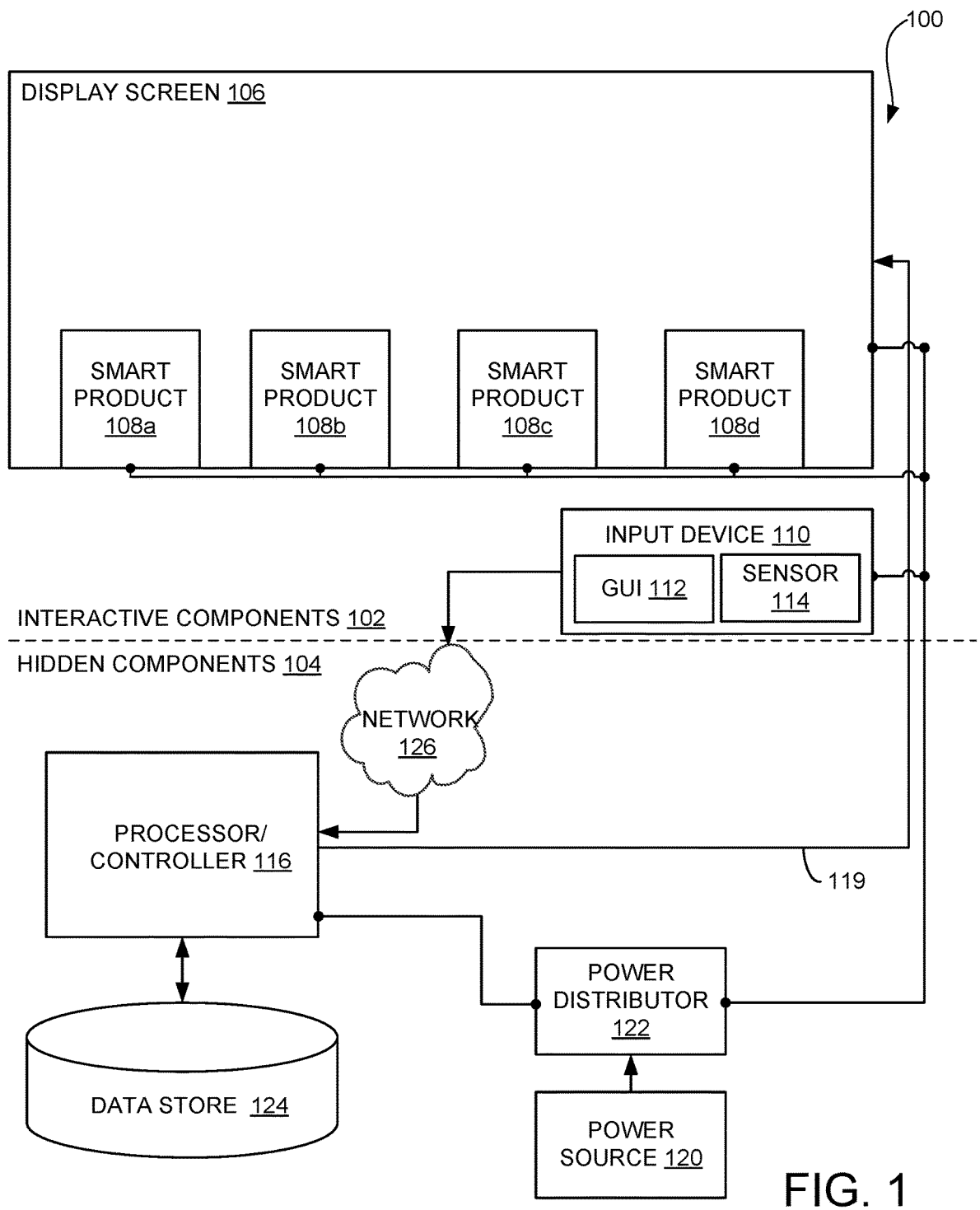
FIG. 1 is a schematic block diagram illustrating a display system according to one embodiment.

FIG. 1 is a schematic block diagram illustrating a display system 100 according to one embodiment. Components of display system 100 are divided into two categories: interactive components 102 (illustrated above the dashed line) and hidden components 104 (illustrated below the dashed line). Interactive components 102 are those components that a customer in a retail store may interact with so as to be educated on and experience different smart products on display. Exemplary interactive components include a display screen 106 located behind a plurality of smart products 108a, 108b, 108c and 108d that are on display and an input device 110 having a graphical user interface (GUI) 112 and a sensor 114. For example, input device 110 can be a tablet computer with a touchscreen display. Each smart product 108a-d is positioned relative to display screen 106 at a set location. Sensor 114 of input device 110 can be an infrared sensor, for example, that detects when a person approaches input device 110.

Exemplary hidden components 104 include a processor or controller 116, a power source 120, a power distributor 122 and a data store 124 that contains a plurality of different scenes or vignettes and a plurality of timing instructions. Hidden components 104 are those components that are hidden from view and are not for interaction by a customer. Such hidden components 104 can be located, for example, within the fixture on to which the interactive components 102 are displayed or behind a wall that is located behind interactive components 102.

As illustrated in FIG. 1, processor or controller 116 is coupled to display screen 106 by a cable 119, such as a HDMI cable, and receives power from power distributor 122. Input device 110 is located in proximity to display screen 106 and the plurality of smart products 108a-d receive power from power distributor 122. Input device 110 is coupled to processor or controller 116 by way of a network 126, for example a wireless network, or other type of network such as a hardwired network. Graphical user interface (GUI) 112 of input device 110 is capable of displaying a list of selectable scenes.

Processor or controller 116 is further coupled to data store 124. Processor or controller 116 can access the scenes or vignettes and timing instructions in data store 124 and instruct that the scenes or vignettes be played on display screen 106. Each scene or vignette includes digital media content, such as an animation, having a set run time. More particularly, the digital media content includes a sequence of frames of digital images.

Figure 2:
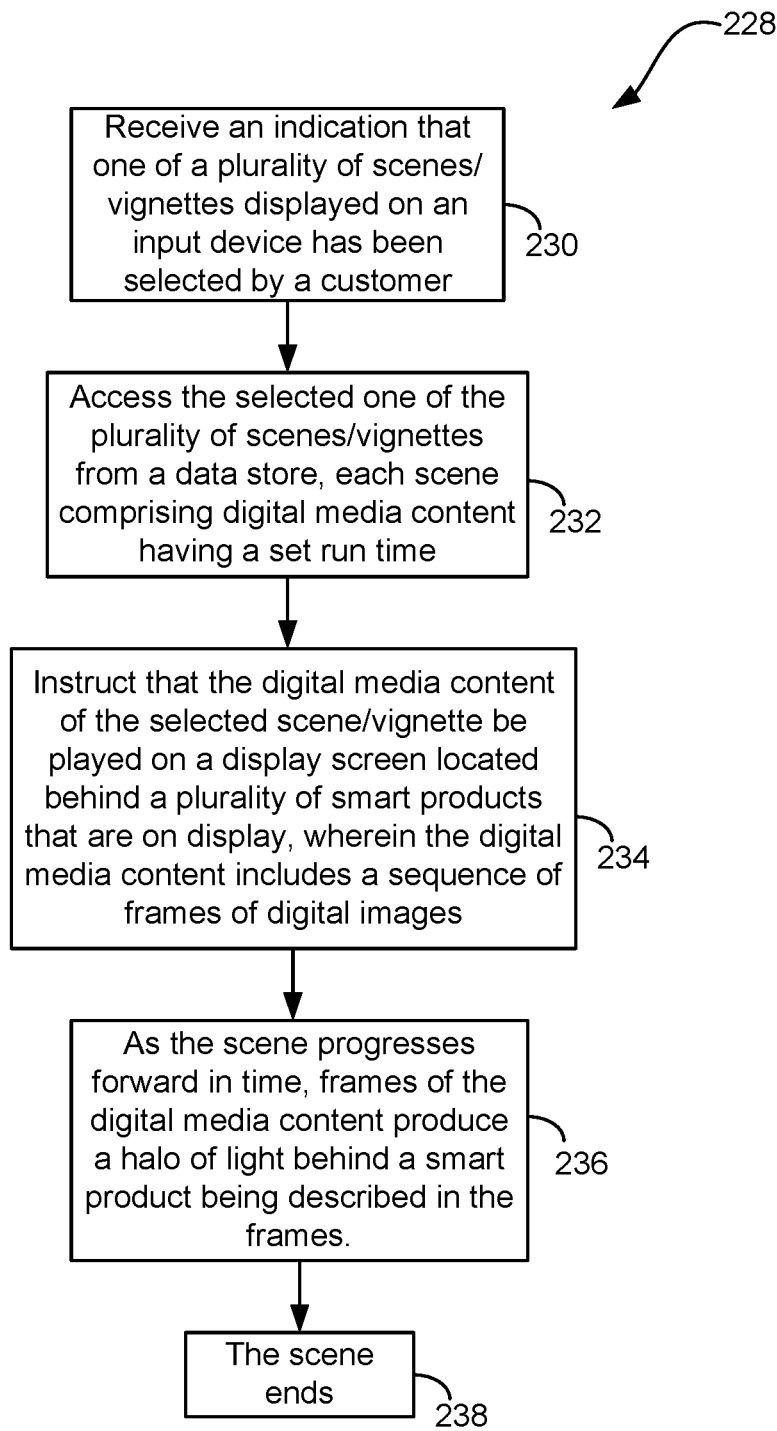
FIG. 2 is a flow diagram illustrating a method of displaying digital media content on a display screen according to one embodiment.
Figures 1, 3:
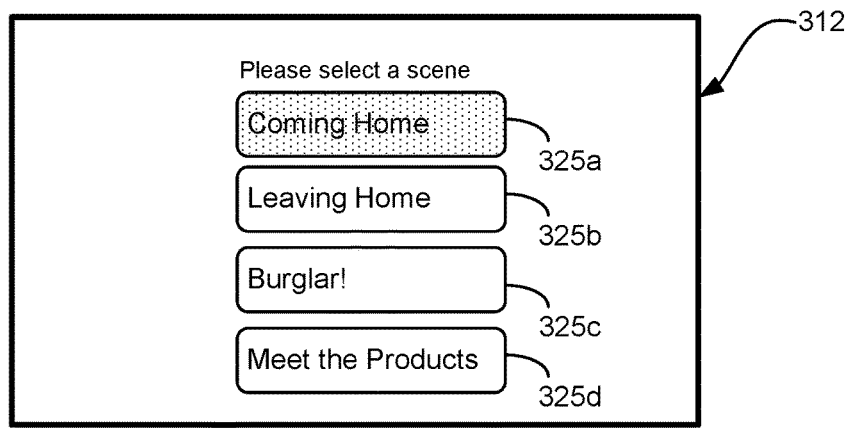
Figures 2, 3:
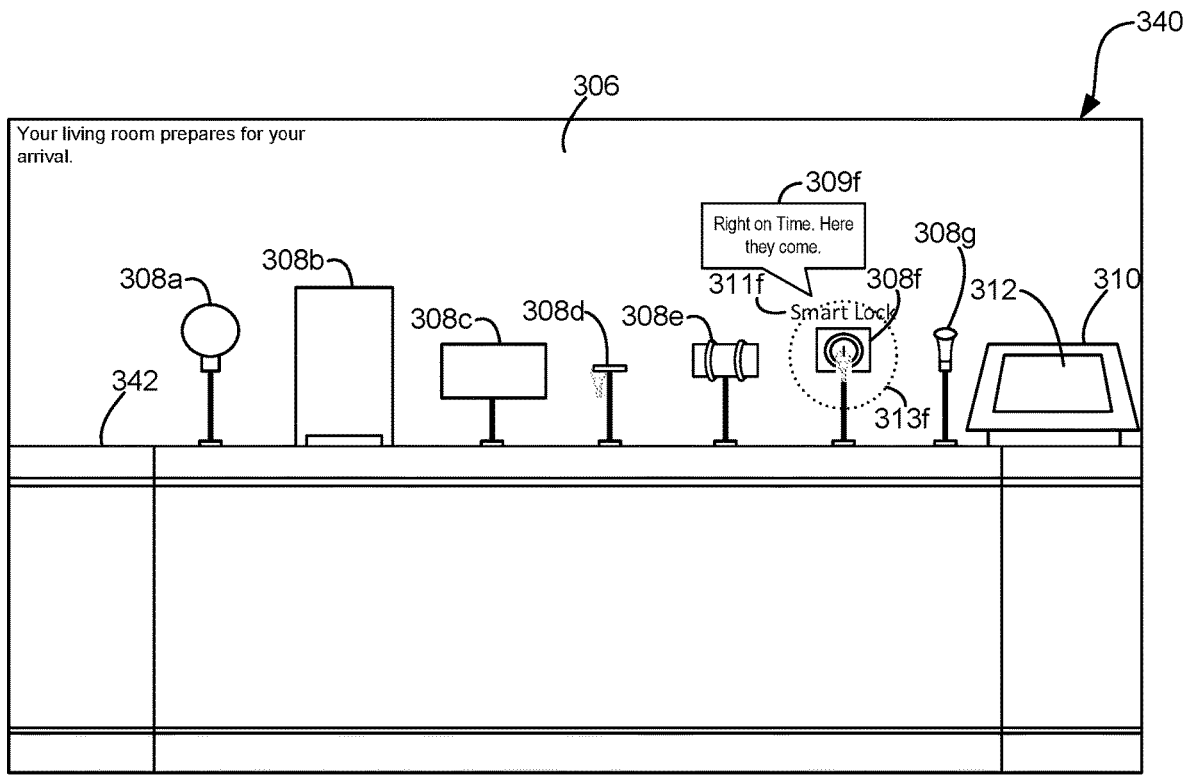
Figure 3:
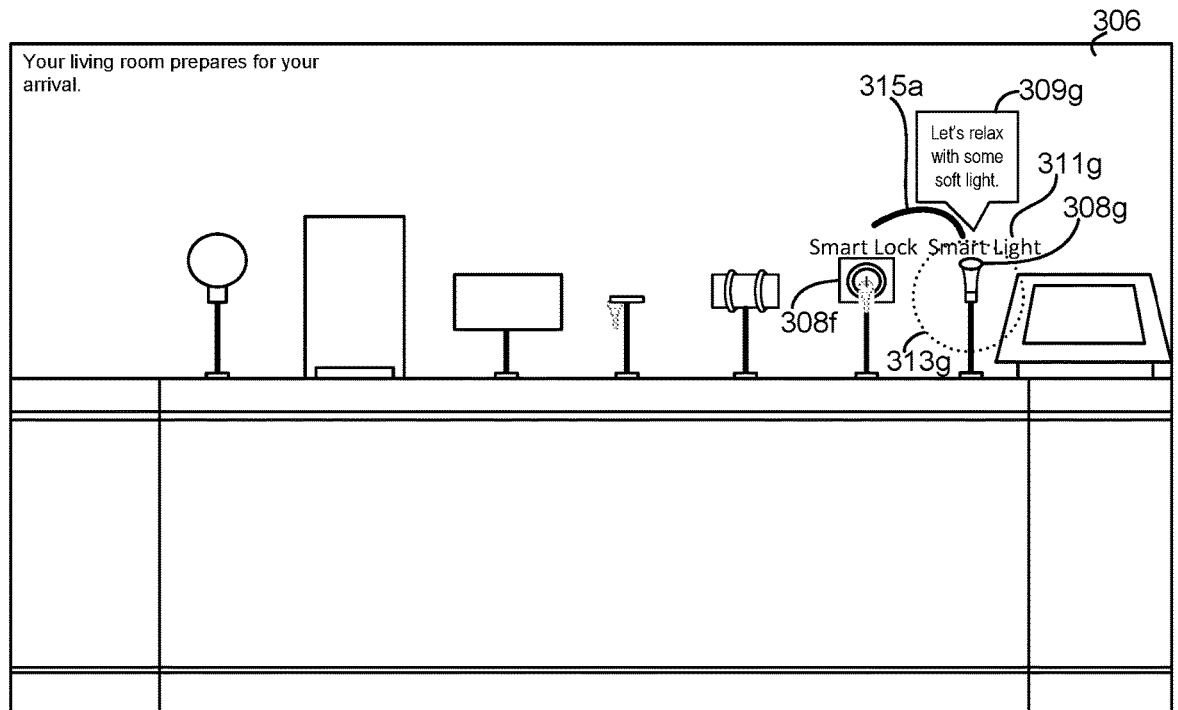

FIG. 2 is a flow diagram 228 illustrating a method of displaying digital media content on a display screen according to one embodiment. FIG. 3-1 illustrates an exemplary graphical user interface (GUI) 312, which is one version of GUI 112, according to one embodiment. FIGS. 3-2 through 3-6 show front views of a display setting 340 that includes a display screen 306, which is an example of display screen 106 according to one embodiment. The front views are taken at respective times during the run time of a selected one of a plurality of scenes or vignettes being displayed on display screen 306.

As illustrated in FIGS. 3-2 through 3-6, display setting 340 includes a display table 342 that supports a plurality of smart products 308a-g that are on display. In the embodiment illustrated in FIGS. 3-2 through 3-6, each smart product 308a-g is supported by a placement mount so each smart product is fixed to display table 342. As illustrated, exemplary placement mounts include posts that protrude from the top of display table 342 as shown. Exemplary GUI 312 in FIG. 3-1 is located on input device 310 in FIGS. 3-2 through 3-6. Together, FIG. 1 and FIGS. 3-1 through 3-6 will be used to describe the method of displaying digital media content illustrated in flow diagram 228 of FIG. 2.

At block 230, processor/controller 116 receives an indication that one of a plurality of scenes or vignettes that are displayed on GUI 312 has been selected by a customer. As shown in FIG. 3-1, the plurality of scenes or vignettes presented to the customer in GUI 312 include a Coming Home scene 325a, a Leaving Home scene 325b, a Burglar! scene 325c and a Meet the Products scene 325d. As illustrated by the dotted fill in FIG. 3-1, Coming Home scene 325a was selected by the customer, for example.

Upon receipt of the indication of selection of one of the plurality of selectable scenes or vignettes and at block 232, processor/controller 116 accesses the corresponding selected one of the plurality of scenes or vignettes from data store 124. As previously described, each scene or vignette, such as each scene or vignette 325a, 325b, 325c and 325d, has a set run time. At block 234, processor controller 116 instructs that the digital media content of the selected scene/vignette be played on display screen 106/306, which, as illustrated in FIGS. 1 and 3-1 through 3-6 is located behind a plurality of smart products 108a-d/308a-g. As also previously described, the digital media content of each scene/vignette is a sequence of frames of digital images. At block 236, as the selected scene or vignette is displayed on display screen 108/306 and progresses forward in time, select frames of the digital media content produce a halo of light behind each smart product being described in the selected frame.

As previously described, FIGS. 3-2 through 3-6 illustrate snapshots of an exemplary run time of digital media content. Throughout the run time, text is rendered on display screen 306 in the upper left corner describing the scene or vignette selected. The scene or vignette Coming Home 325a (as shown as being selected in FIG. 3-1) is a scene/vignette that describe a living room preparing for the arrival of its residents. As illustrated in FIG. 3-2. the digital media content of the selected scene or vignette Coming Home 325a is displayed on display screen 306 and begins with a balloon 309f having associated text that is rendered on display screen 306 to point at a Smart Lock 308f, which is one of the smart products on display. In addition, a label 311f for Smart Lock 308f is rendered on display screen 306 directly above the smart product and a halo of light 313f is rendered on display screen 306 directly behind and around Smart Lock 308f.

A smart lock is an electromechanical product designed to perform locking and unlocking operations on a door when it receives such instructions from an authorized device using a wireless protocol and a cryptographic key to execute the authorization process. A smart lock can monitor access and send alerts for the events it monitors and is considered to be a product that can be part of a connected smart home. As illustrated in FIG. 3-2, the text in balloon 309f describes what Smart Lock 308f would be processing internally in regards to a situation like scene or vignette Coming Home 325a.

Next and as illustrated in FIG. 3-3, balloon 309f and halo of light 313f disappear and a curved line 315a is rendered on display screen 306 in a way that it appears to be a line being drawn from Smart Lock 308f to another smart product, such as to Smart Light 308g. A smart light is a personal wireless lighting system that receives wireless instructions for turning on and off, setting mood color and etc. Rendered line 315a infers that Smart Lock 308f is in some way interconnected to Smart Light 308g to notify Smart Light 308g that the residents of the home have arrived. The digital media content of the selected scene/vignette 325a then displays a balloon 309g that is rendered on display screen 306 to point at Smart Light 308g and includes associated text. A label 311g for Smart Light 308g is rendered directly above the product on display screen 306 and a halo of light 313g is rendered directly behind and around Smart Lock 308g on display screen 306. As illustrated in FIG. 3-3, the text in balloon 309g describes what Smart Light 308g would be processing internally in regards to a situation like scene or vignette Coming Home 325a.

Figures 3, 4:
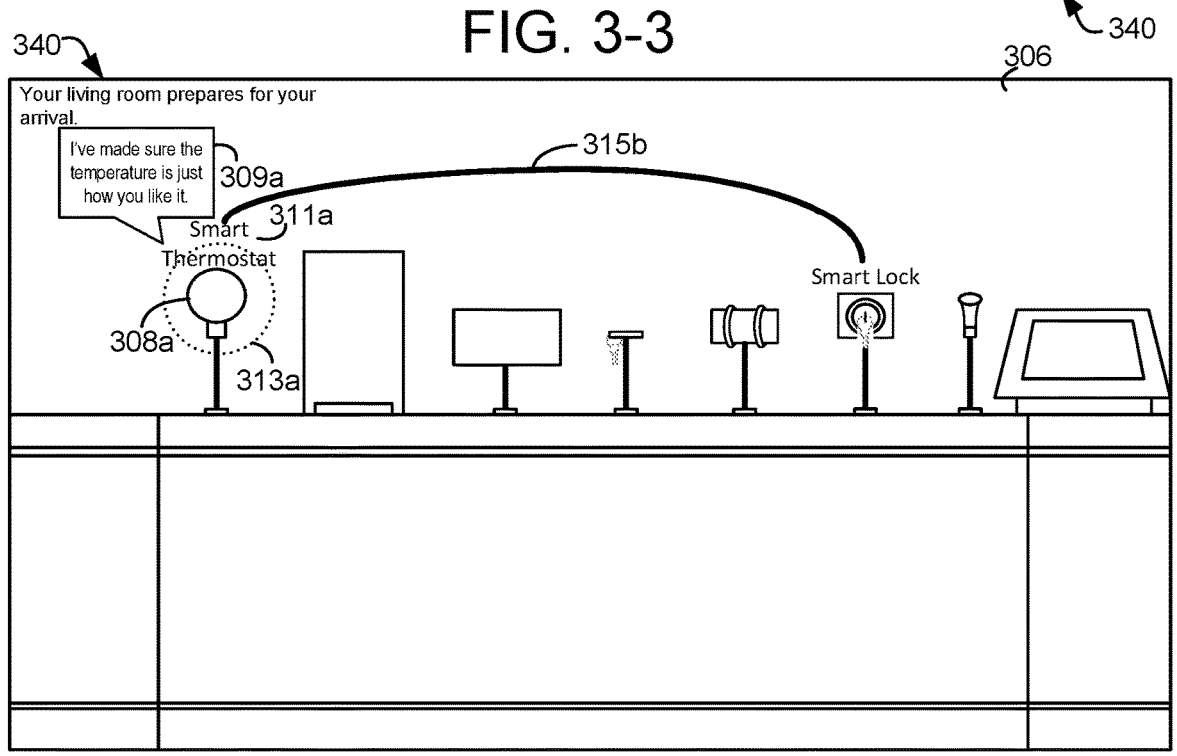

As illustrated in FIG. 3-4, balloon 309g, label 311g, halo of light 313g and curved line 315a disappear and another curved line 315b is rendered on display screen 306 in a way that it appears to be a line being drawn from Smart Lock 308f to yet another smart product, such as to Smart Thermostat 308a. A smart thermostat is a programmable, self-learning, sensor driven, wireless enabled thermostat. Rendered line 315b infers that Smart Lock 308f is in some way connected to Smart Thermostat 308a to notify Smart Thermostat 308a that the residents of the home have arrived. The digital media content of the selected scene/vignette 325a then displays a balloon 309a that is rendered on display screen 306 to point at Smart Thermostat 308a and includes associated text. A label 311a for Smart Thermostat 308a is rendered directly above the product on display screen 306 and a halo of light 313a is rendered directly behind and around Smart Thermostat 308a on display screen 306. As illustrated in FIG. 3-4, the text in balloon 309a describes what Smart Thermostat 308a would be processing internally in regards to a situation like scene or vignette Coming Home 325a.

Figures 3, 4, 5:
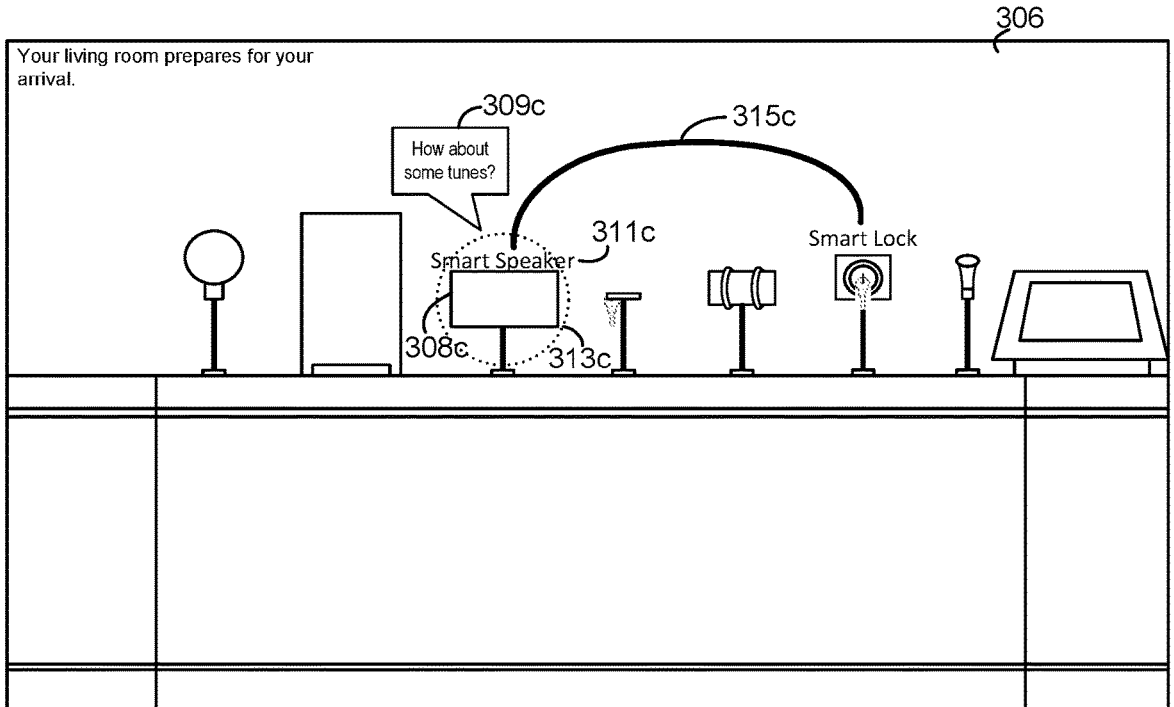

As illustrated in FIG. 3-5, balloon 309a, label 311a, halo of light 313a and curved line 315b disappear and yet another curved line 315c is rendered on display screen 306 in a way that it appears to be a line being drawn from Smart Lock 308f to yet another smart product, such as to Smart Speaker 308c. A smart speaker is a part of a network of wireless and/or Ethernet connected speakers which allows for the streaming of audio to any speaker on the network. Rendered line 315c infers that Smart Lock 308f is in some way interconnected to Smart Speaker 308c to notify Smart Speaker 308c that the residents of the home have arrived. The digital media content of the selected scene/vignette 325a then displays a balloon 309c that is rendered on display screen 306 to point at Smart Speaker 308c and includes associated text. A label 311c for Smart Speaker 308c is rendered directly above the product on display screen 306 and a halo of light 313a is rendered directly behind and around Smart Speaker 308c on display screen 306. As illustrated in FIG. 3-5, the text in balloon 309c describes what Smart Speaker 308c would be processing internally in regards to a situation like scene vignette Coming Home 325a.

As illustrated in FIG. 3-6, balloon 309c, label 311c, halo of light 313c and curved line 315c disappear. The scene/vignette proceeds forward in time and highlights one additional smart product, such as Smart Feeder 308b. As illustrated, it is possible that not all smart products are interconnected as shown by curved lines 315a, 315b and 315c between Smart Lock 308f and other smart products, but that certain smart products can process internally without communication from another of the smart products on display. A smart feeder manages feeding times, portion sizes, food supply for a pet and etc. In FIG. 3-6, the digital media content of the selected scene/vignette 325a displays a balloon 309b that is rendered on display screen 306 to point at Smart Feeder 308b and includes associated text. A label 311b for Smart Speaker 308b is rendered directly above the product on display screen 306 and a halo of light 313b is rendered directly behind and around Smart Feeder 308b on display screen 306. As illustrated in FIG. 3-6, the text in balloon 309b describes what Smart Feeder 308b would be processing internally in regards to a situation like scene vignette Coming Home 325a. Scene/vignette 325a ends at block 238 in FIG. 2.

FIG. 4 is a schematic block diagram illustrating a display system 400 according to another embodiment. Like display system 100, components of display system 400 are divided into two categories: interactive components 402 (illustrated above the dashed line) and hidden components 404 (illustrated below the dashed line). Interactive components 402 are those components that a customer in a retail store may interact with so as to be educated on and experience different smart products on display. Exemplary interactive components include a display screen 406 located behind a plurality of smart products 408a, 408b, 408c and 408d that are on display and an input device 410 having a graphical user interface (GUI) 412 and a sensor 414. Each smart product 408a-d is positioned relative to display screen 406 at a set location. Sensor 414 of input device 410 can be an infrared sensor, for example, that detects when a person approaches input device 410.

Exemplary hidden components 404 include a processor or controller 416, a power source 420, a power distributor 422 and a data store 124 that contains a plurality of different scenes or vignettes 424 and a plurality of timing instructions. Hidden components 404 are those components that are hidden from view and are not for interaction by a customer. Such hidden components 404 can be located, for example, within the fixture on which the interactive components 402 are displayed or behind a wall that is located behind the interactive components 402.

As illustrated in FIG. 4, processor or controller 416 is coupled to display screen 406 by a cable 419, such as a HDMI cable, and receives power from power distributor 422. Input device 410 is located in proximity to display screen 406 and the plurality of smart products 408*a-d* receive power from power distributor 422. Input device 410 is coupled to processor or controller 416 by way of a network 426, for example a wireless network, or other type of network such as a hardwired network. Graphical user interface (GUI) 412 of input device 410 is capable of displaying a plurality of selectable scenes.

Processor or controller 416 is further coupled to data store 424. Still further, processor or controller 416 is coupled to a microprocessor in each of the plurality of smart products 408*a-d* over network 426. As previously described, network 426 can be a wireless network or a hardwired network. Processor or controller 416 can access the scenes or vignettes and timing instructions in data store 424 and instruct that the scenes or vignettes be played on display screen 406. Each scene or vignette includes digital media content, such as an animation, having a set run time. More particularly, the digital media content includes a sequence of frames of digital images.

Figures 3, 4, 5, 6:
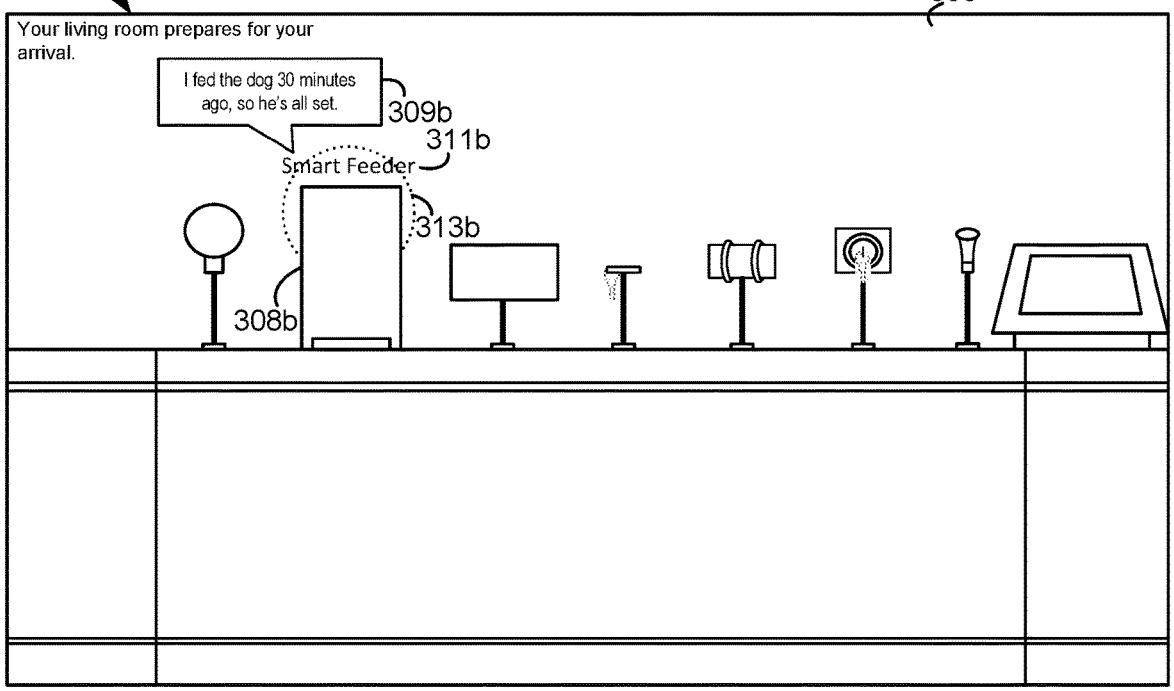
Figure 4:
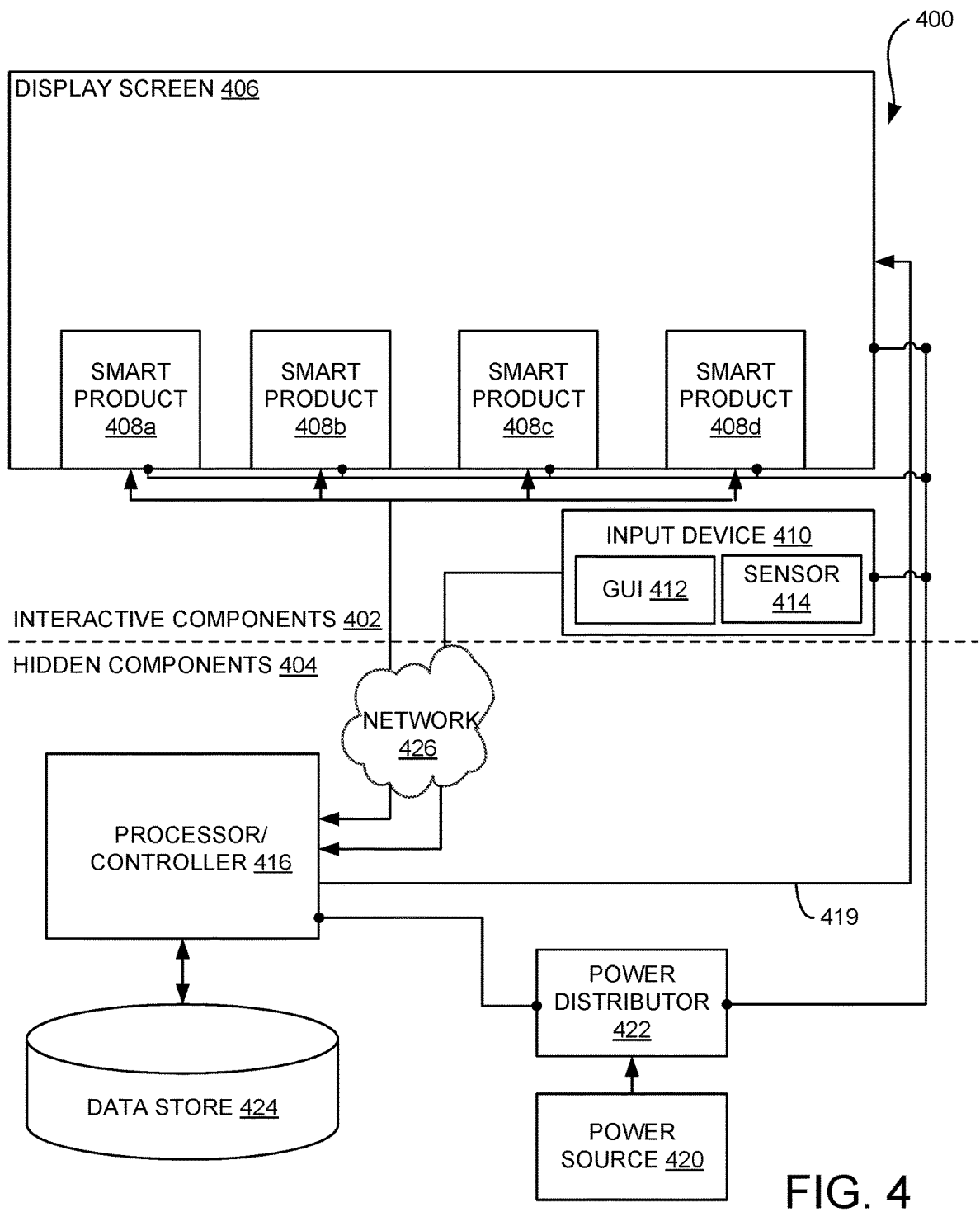
Figure 5:
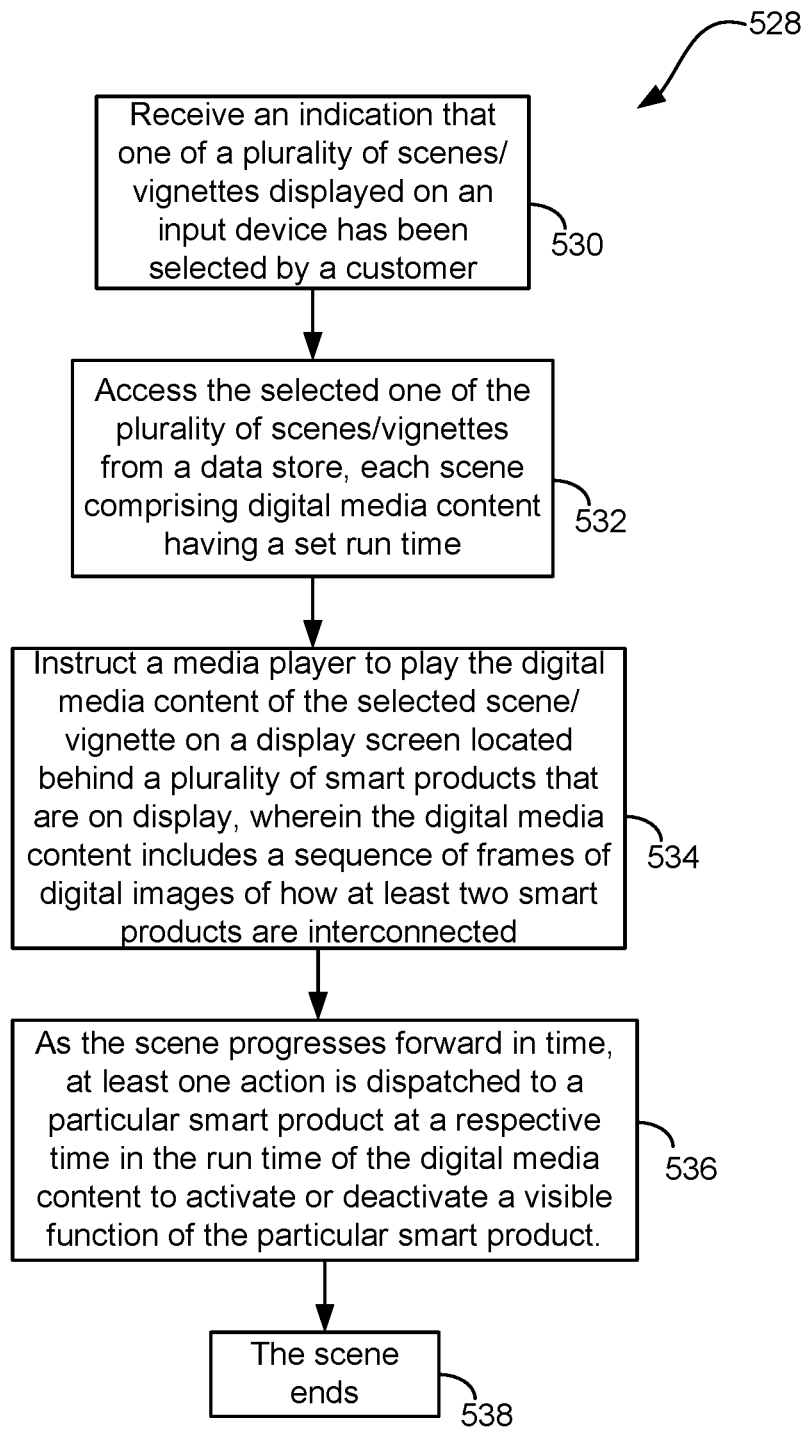
Figures 1, 6:
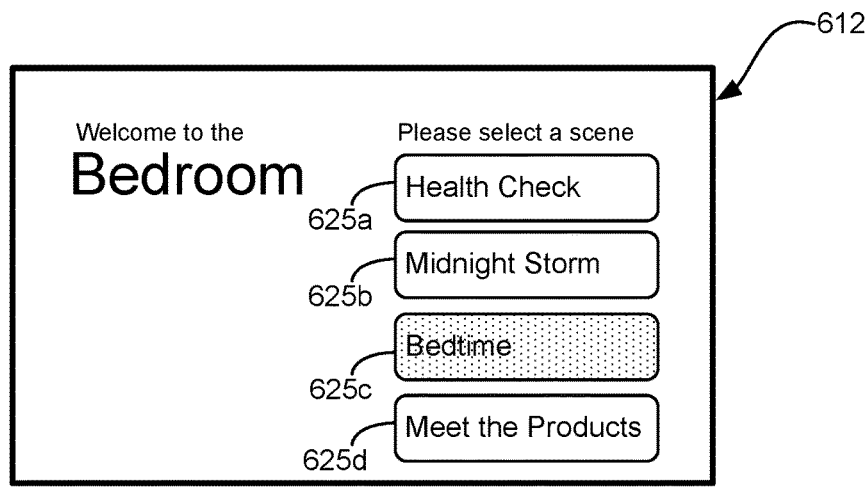
Figures 2, 6:
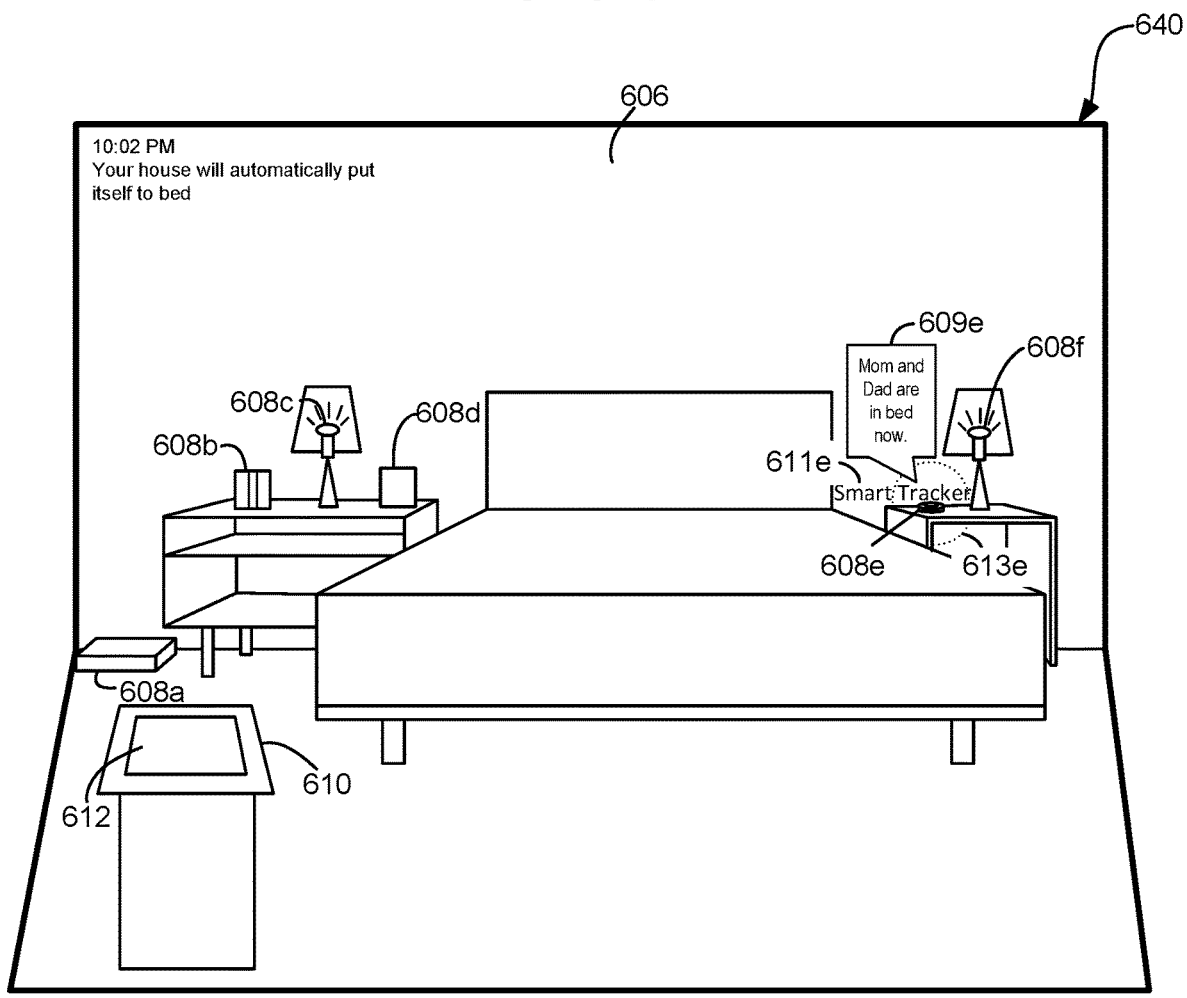
Figures 3, 6:
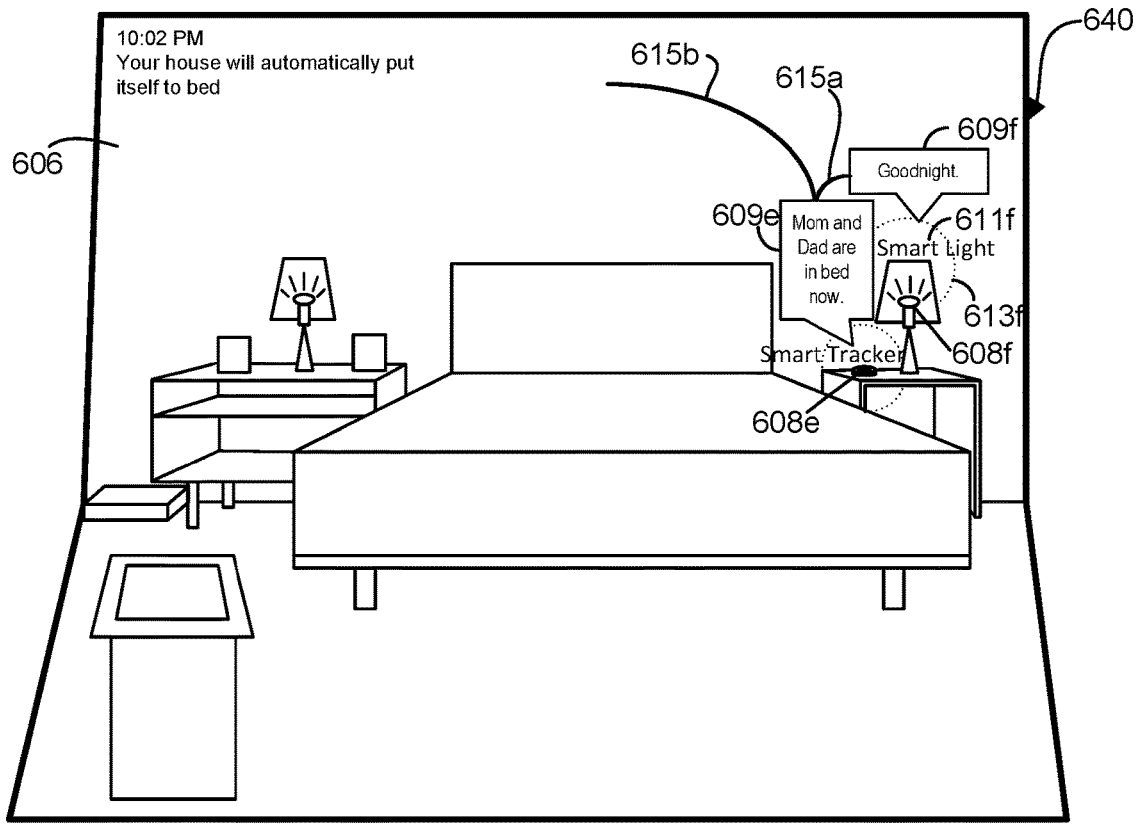
Figures 4, 6:
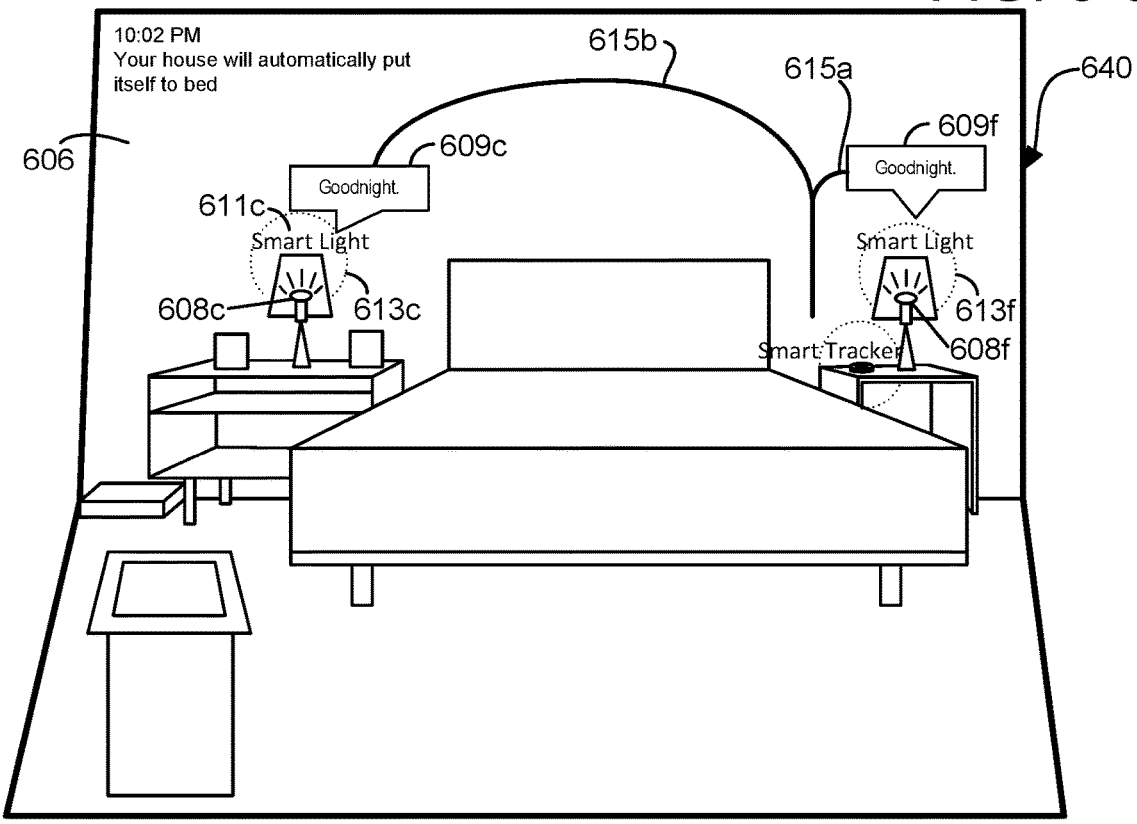
Figures 5, 6:
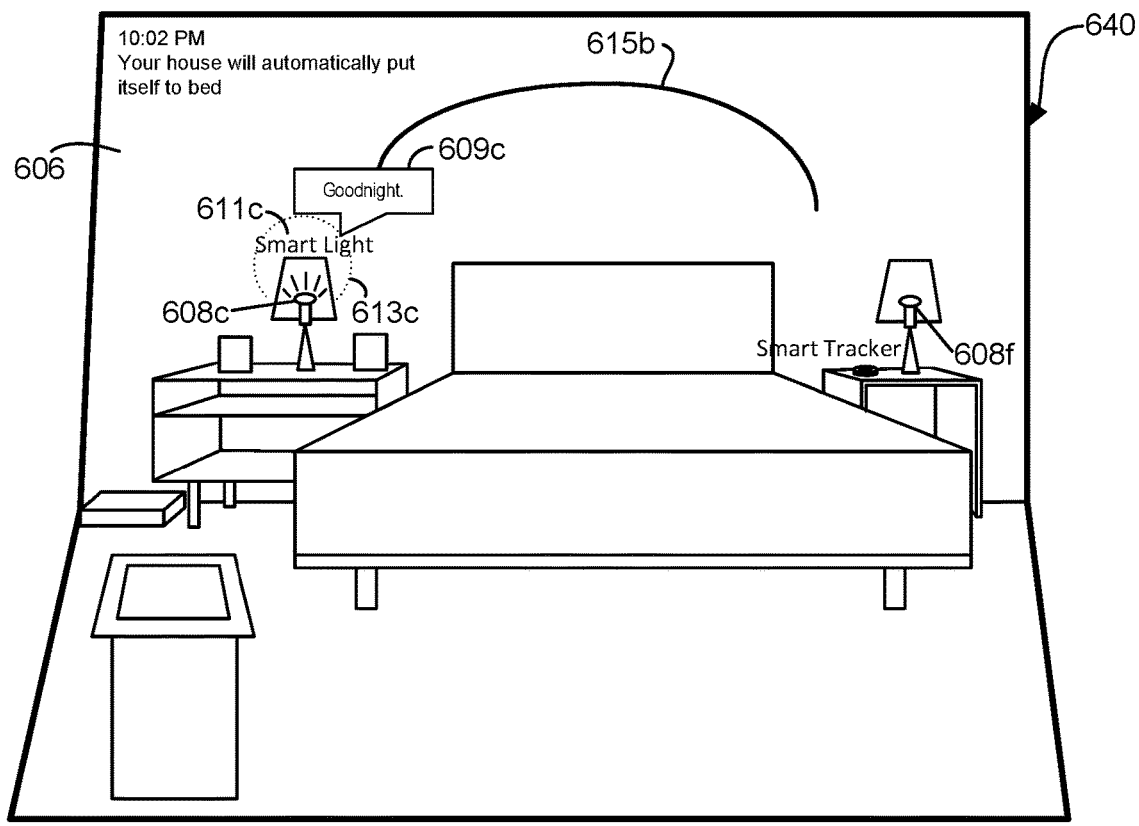
Figure 6:
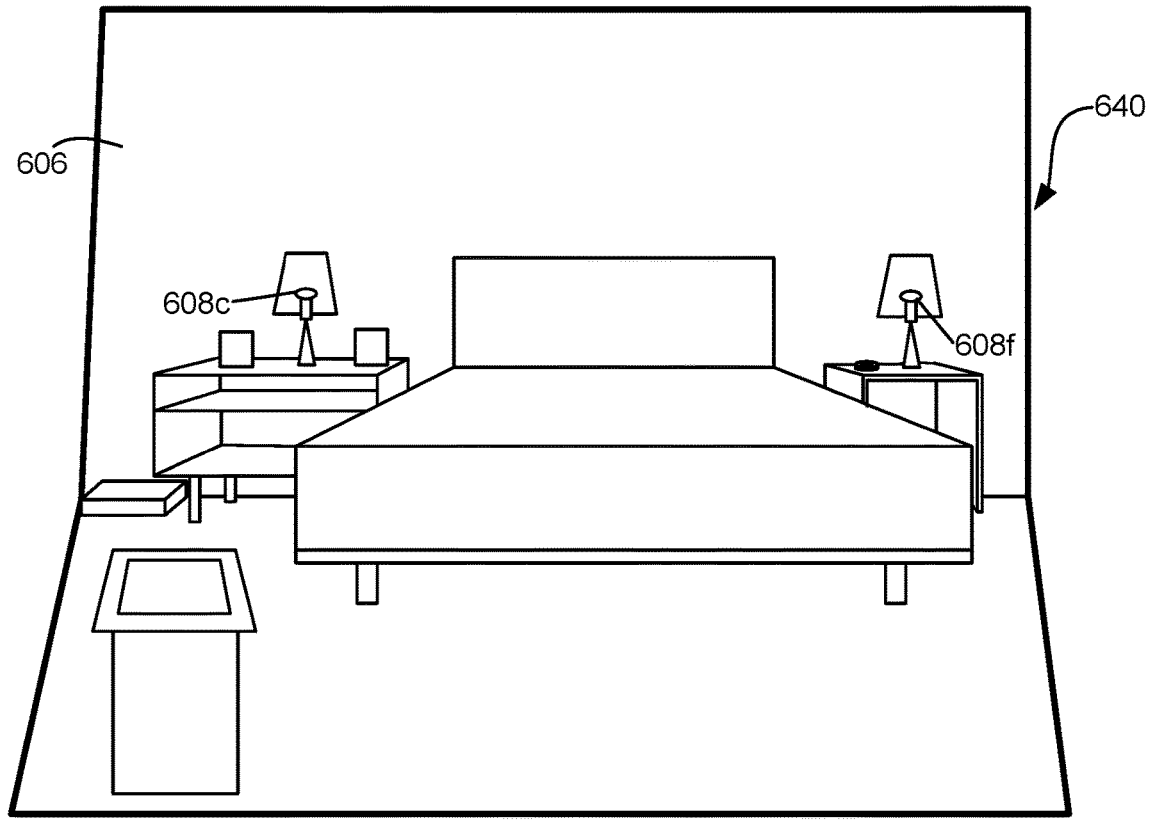

FIG. 5 is a flow diagram 528 illustrating a method of displaying digital media content on a display screen according to one embodiment. FIG. 6-1 illustrates an exemplary graphical user interface (GUI) 612, which is an example of GUI 412, according to one embodiment. FIGS. 6-2 through 6-6 show front perspective views of a display setting 640 that includes a display screen 606, which is an example of display screen 406 in accordance with one embodiment. The front perspective views are taken at respective times during the run time of a selected one of a plurality of scenes or vignettes being displayed on display screen 306.

As illustrated in FIGS. 6-2 through 6-6, display setting 640 includes furnishings to exemplify a room in a house. For example, display setting 640 includes end tables and a bed in a bedroom of a house. A plurality of smart products 608*a-f* are arranged throughout display setting 640 including some of the plurality of smart products being supported by the furnishings.

Display screen 606 is located behind the furnishing and behind the plurality of smart products 608*a-f*. Exemplary GUI 612 in FIG. 6-1 is located on input device 610 in FIGS. 6-2 through 6-6 and in FIGS. 7-2 through 7-11. Together, FIG. 4 and FIGS. 6-1 through 6-6 will be used to describe one exemplary method of displaying digital media content illustrated in flow diagram 528 of FIG. 5 and FIG. 4 and FIGS. 7-1 through 7-11 will be used to describe another exemplary method of displaying digital media content illustrated in flow diagram 528 of FIG. 5.

At block 530, processor/controller 416 receives an indication that one of a plurality of scenes or vignettes that are displayed on GUI 412/612 has been selected by a customer. As shown in FIG. 6-1, the plurality of scenes or vignettes presented to the customer in GUI 612 include a Health Check scene 625*a*, a Midnight Storm scene 625*b*, a Bedtime scene 625*c* and a Meet the Products scene 625*d*. As illustrated by the dotted fill in FIG. 6-1, Bedtime scene 325*a* was selected by the customer.

Upon receipt of the indication of selection of one of the plurality of selectable scenes or vignettes and at block 532, processor/controller 416 accesses the selected one of the plurality of scenes or vignettes from data store 424. As previously described, each scene or vignette, such as each scene or vignette 625*a*, 625*b*, 625*c* and 625*d*, has a set run time. At block 534, processor controller 416 instructs that the digital media content of the selected scene/vignette be played on display screen 406/606, which, as illustrated in FIGS. 4 and 6-1 through 6-6 is located behind a plurality of smart products 408*a-d* or 608*a-f*. As also previously described, the digital media content of each scene/vignette is a sequence of frames of digital images. At block 536, as the selected scene or vignette is displayed on display screen 406/606 and progresses forward in time, processor/controller 416 activates or deactivates a tangible function on a particular smart product based on timing instructions accessed from data store 424.

As previously described, FIGS. 6-2 through 6-6 illustrate front perspective views of an exemplary run time of digital media content. Throughout the run time, text is rendered on display screen 606 in the upper left corner describing the scene or vignette selected. The scene or vignette Bedtime 625*c* (as shown as being selected in FIG. 6-1) is a scene or vignette that describes a bedroom automatically putting itself to bed. As illustrated in FIG. 6-2, the digital media content of the selected scene or vignette Bedtime 625*c* is displayed on display screen 606 and begins proceeding forward in time. To begin with, tangible functions on smart products 608*c* and 608*f* (i.e., Smart Light 608*c* and Smart Light 608*0* are activated by processor/controller 416 based on the accessed timing instructions. In FIG. 6-2, the activated tangible function on smart products 608*c* and 608*f* is a light that is turned on. This is illustrated by the ray lines emanating from each Smart Light 608*f* and 608*c*. In regards to display 606, a balloon 609*e* is rendered on display screen 606 to point at a Smart Tracker 608*e*, which is one of the smart products on display and includes associated text. A label 611*e* for Smart Tracker 608*e* is rendered directly above Smart Tracker 608*e* on display screen 606 and a halo of light 613*e* is rendered directly behind and around Smart Tracker 608*e* on display screen 606. A smart tracker is also called an activity tracker and is a wearable device for monitoring and tracking fitness-related metrics such as distance walked or ran, calorie consumption, heart rate, quality of sleep and etc. and is used as a dedicated electronic monitoring device that is synced, usually wirelessly, to a computer or smartphone. As illustrated in FIG. 6-2, the text in balloon 609*e* describes what Smart Tracker 608*e* would be processing internally in regards to a situation like scene or vignette Bedtime 625*c*.

Next and as illustrated in FIG. 6-3, a curved line 615*a* is rendered on display screen 606 in a way that it appears to be a line being drawn from balloon 609*e* that is associated with Smart Tracker 608*e* to another smart product, such as to Smart Light 608*f*. A smart light is a personal wireless lighting system that receives wireless instructions for turning on and off lights, setting mood color and etc. Rendered line 615*a* infers that Smart Tracker 608*e* is in some way interconnected to Smart Light 608*f* to notify Smart Light 608*f* that the residents of the home are in bed. The digital media content of the selected scene/vignette 625*c* then displays a balloon 609*f* that is rendered on display screen 606 to point at Smart Light 308*f* and includes associated text. A label 611*f* for Smart Light 608*f* is rendered directly above Smart Light 608f on display screen 606 and a halo of light 613f is rendered directly behind and around Smart Light 308f on display screen 606. As illustrated in FIG. 6-3, the text in balloon 609f describes what Smart Light 608f would be processing internally in regards to a situation like scene or vignette Bedtime 625c. In this case, because Smart Tracker 608e has processed that the residents are in bed, Smart Light 608f determines that it needs to turn itself off. FIG. 6-3 further illustrates another curved line 615b being rendered on display screen in a way that it appears to be another line being drawn from balloon 609e that is associated with Smart Tracker 608e to another smart product.

As illustrated in FIG. 6-4, curved line 615b is fully rendered and is displayed as a line from balloon 609e to another balloon 609c of another smart product, such as a Smart Light 608c. In addition, balloon 609e disappears. Rendered line 615b infers that Smart Tracker 608e is in some way interconnected to Smart Light 608c to notify Smart Light 608c that the residents of the home are in bed. On display screen 606, a balloon 609c is rendered to point at Smart Light 608c and includes associated text. A label 611c for Smart Light 608c is rendered directly above the product and a halo of light 613c is rendered directly behind and around Smart Light 608c. As illustrated in FIG. 6-4, the text in balloon 609c describes what Smart Light 608c would be processing internally in regards to a situation like scene or vignette Bedtime 625c. In this case, because Smart Tracker 608e has processed that the residents are in bed, Smart Light 608c determines that it needs to turn itself off.

As illustrated in FIG. 6-5, the tangible function of Smart Light 608f is deactivated (i.e., processor/controller 416 turns off the light of Smart Light 6080 as is shown by the absence of ray lines emanating from Smart Light 608f. Balloon 609f, label 611f, halo of light 613f and curved line 315a also disappear. As illustrated in FIG. 6-6, the tangible function of Smart Light 608c is also deactivated (i.e., processor/controller 416 turns off the light of Smart Light 608c) as is shown by the absence of ray lines emanating from Smart Light 608c. Balloon 609c, label 611c, halo of light 613c and curved line 615b also disappear. Scene/vignette 625c ends at block 538 in FIG. 5.

Figures 1, 7:
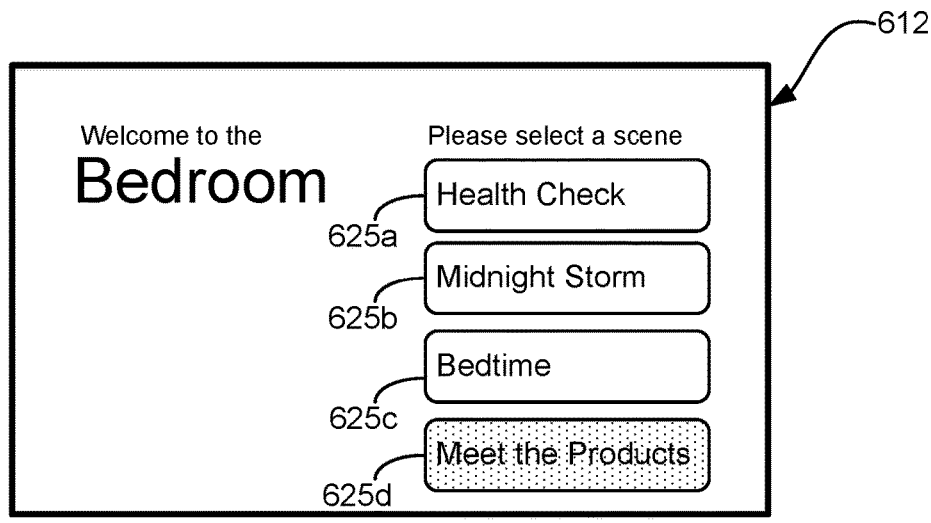
Figures 2, 7:
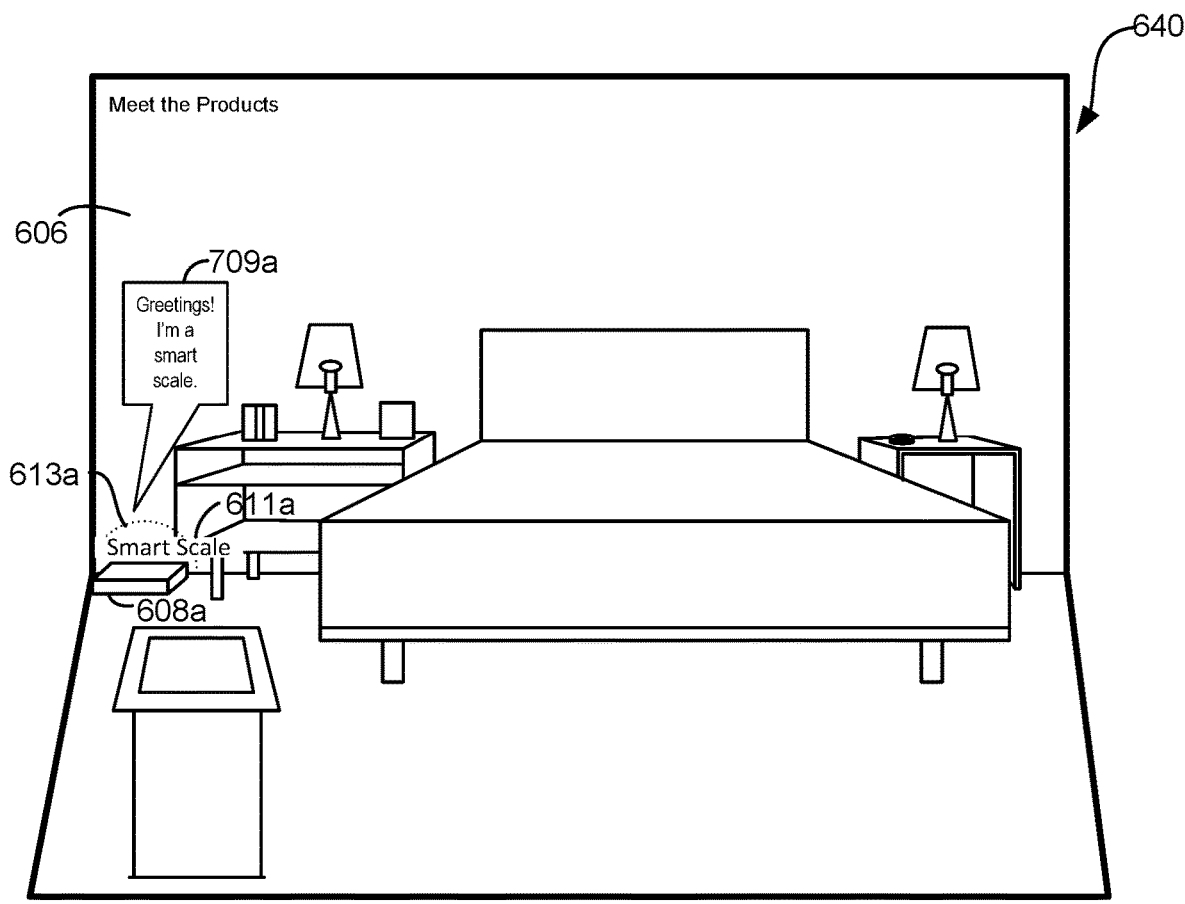
Figures 3, 7:
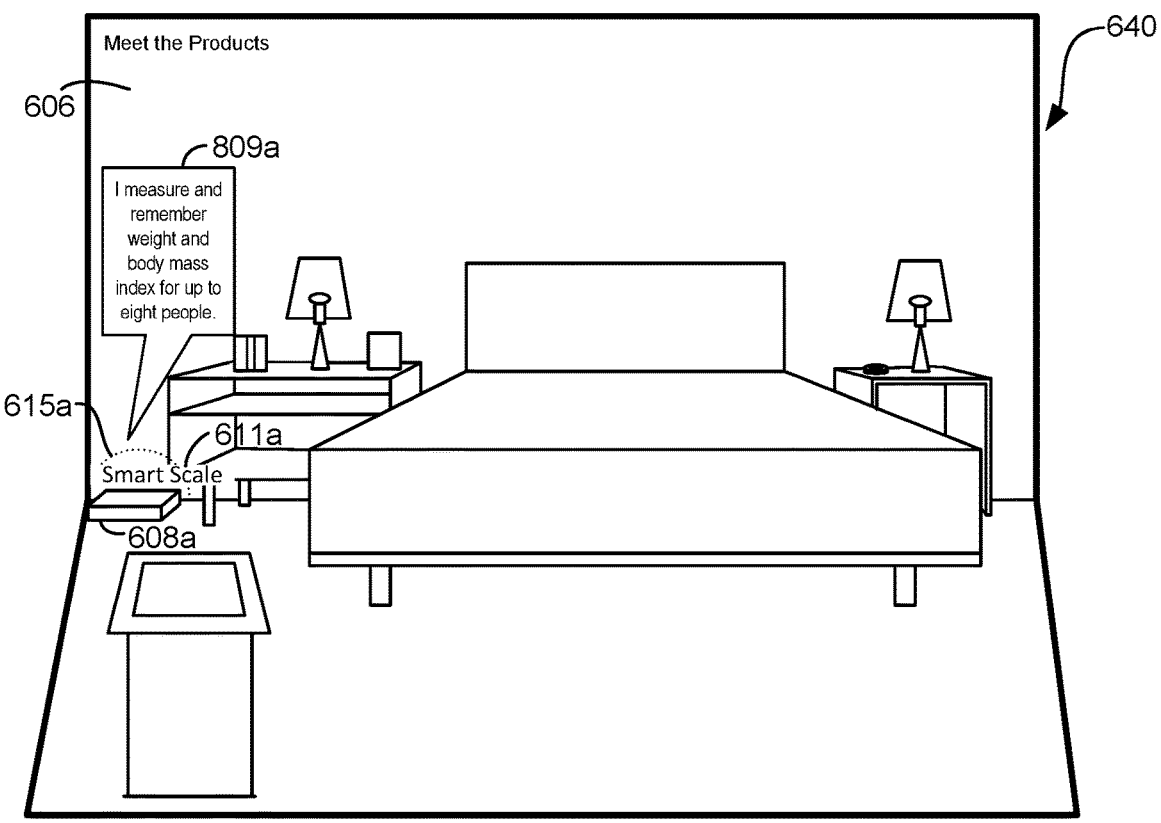
Figures 4, 7:
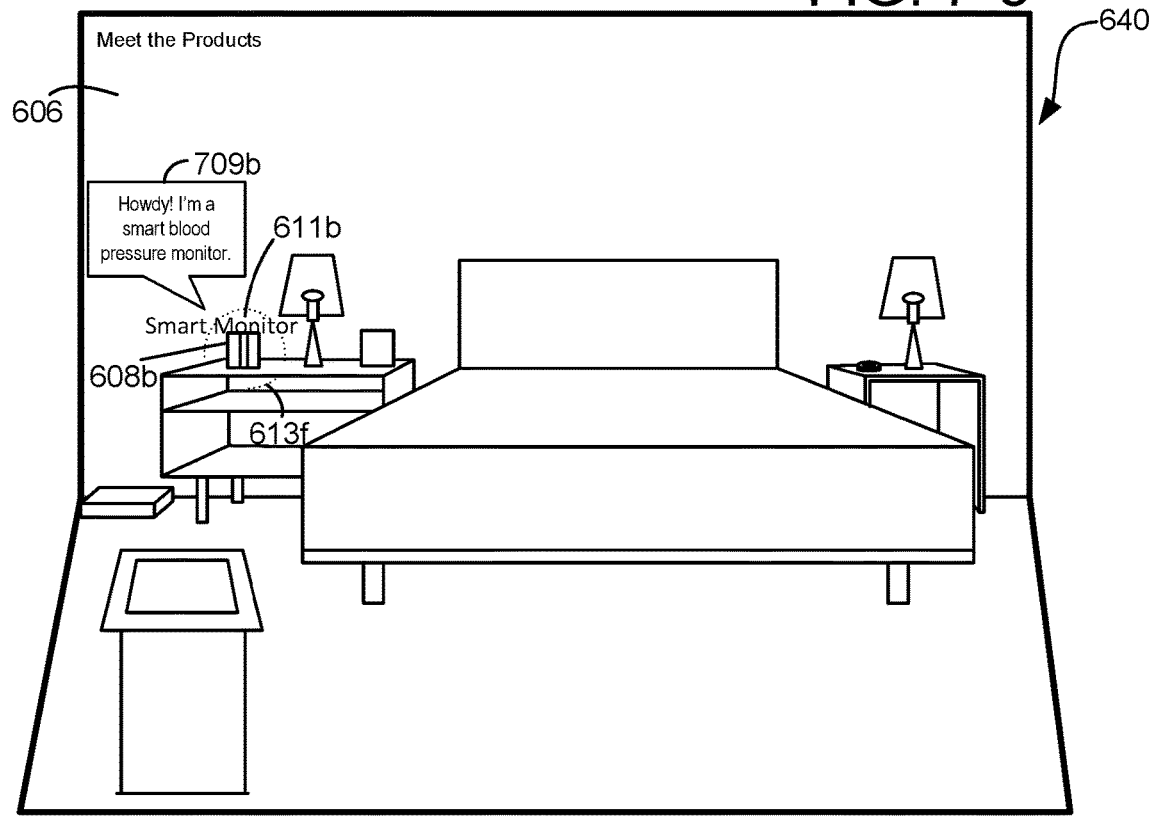
Figures 5, 7:
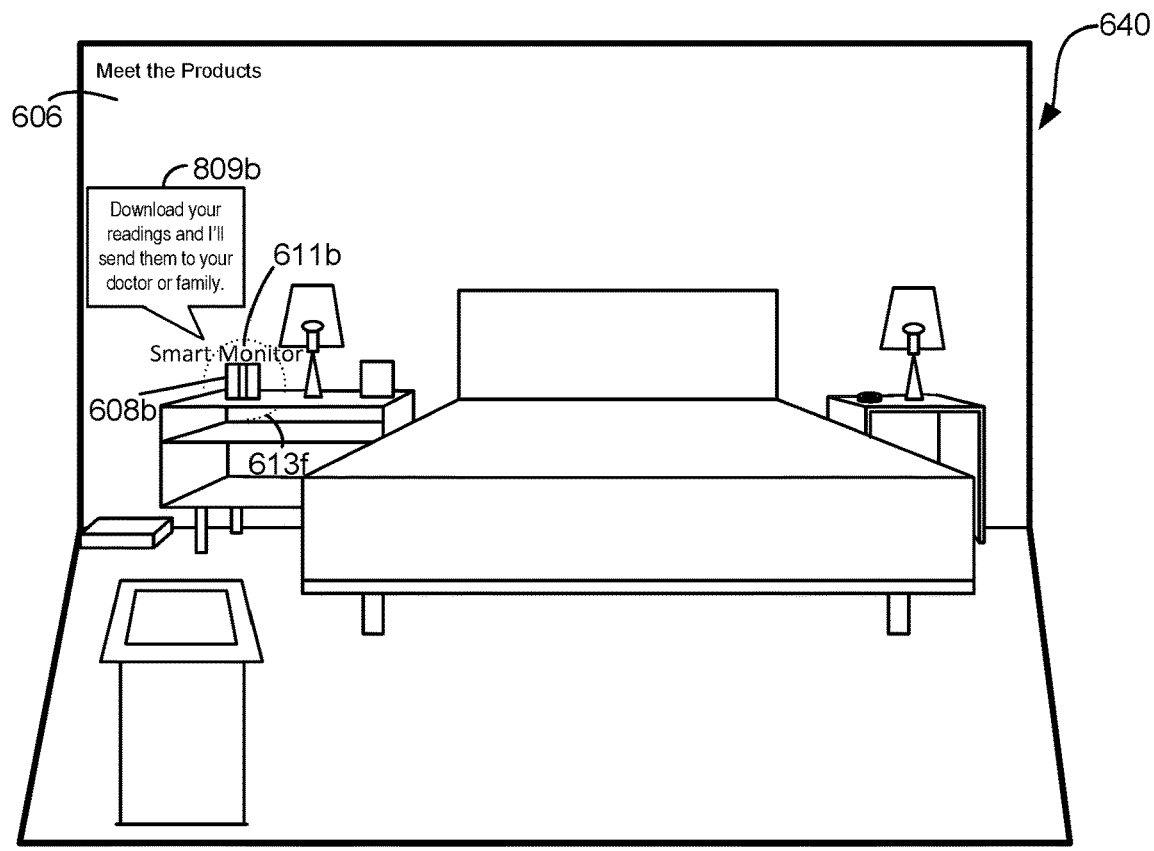
Figures 6, 7:
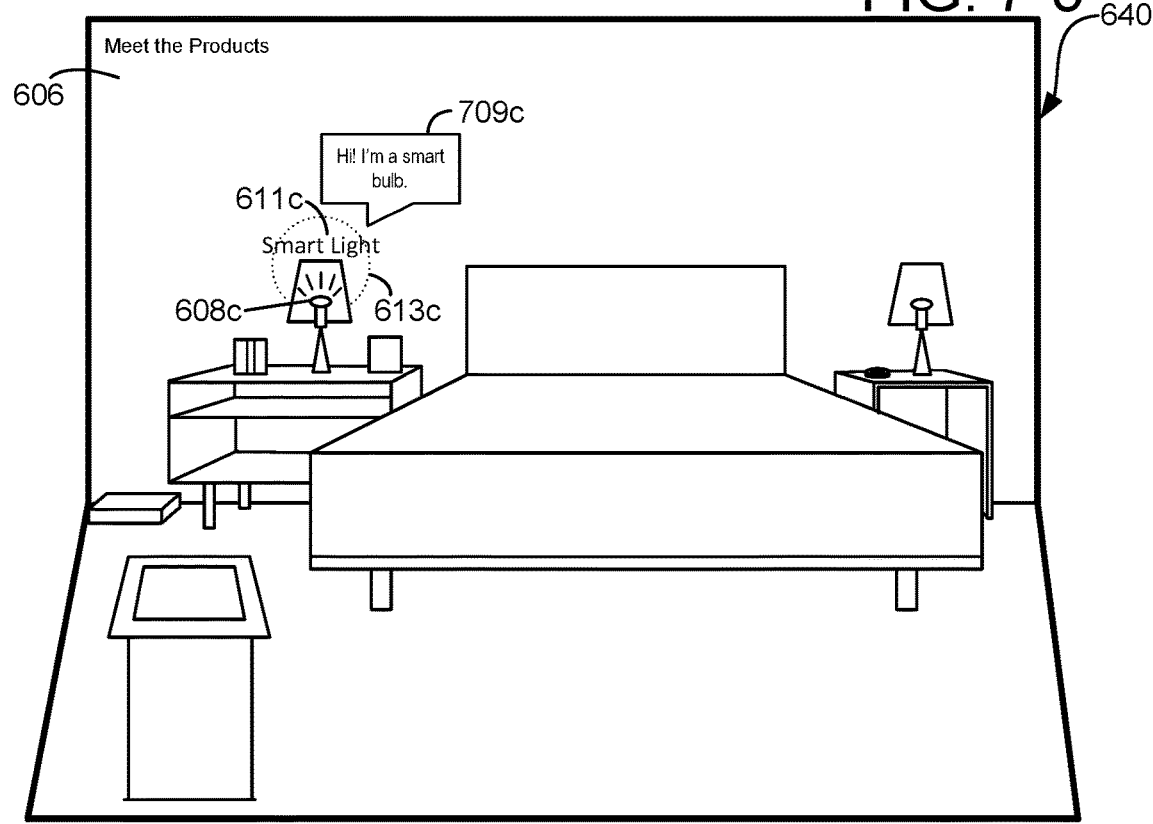
Figure 7:
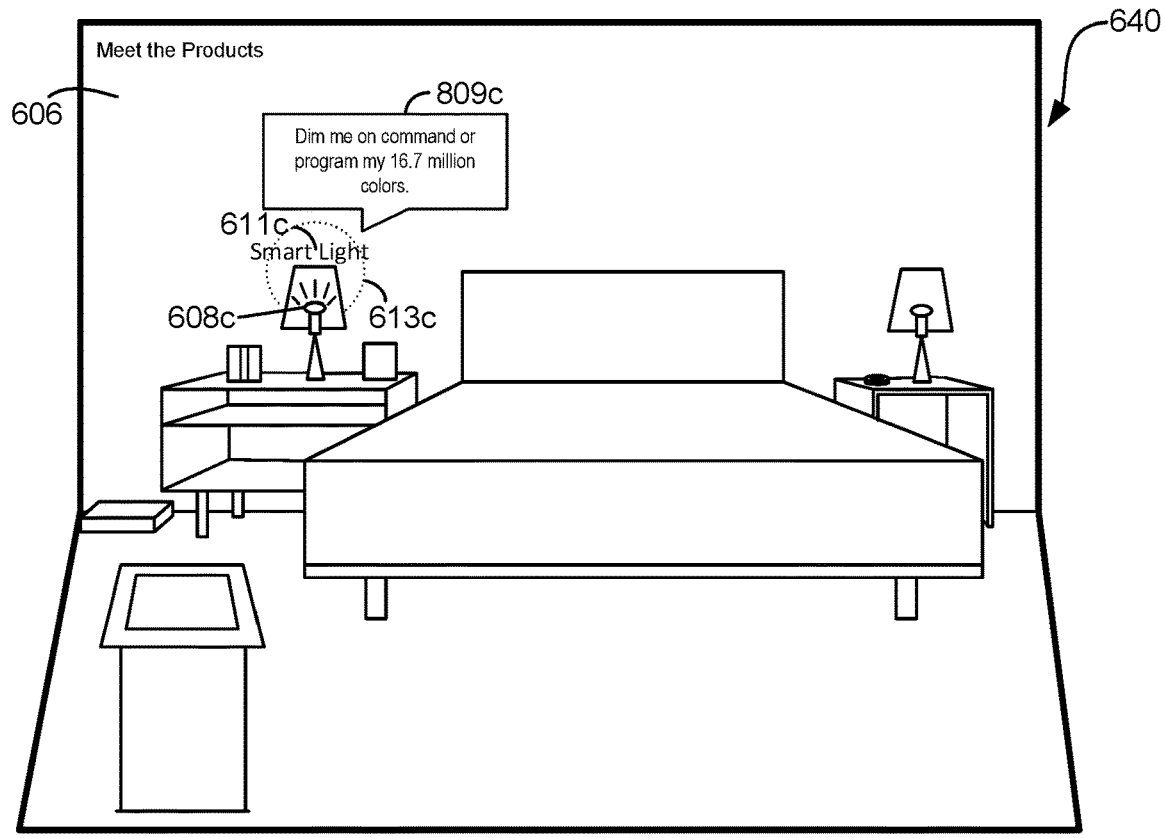

In an alternative embodiment, an indication of a different scene or vignette being received by processor/controller 416 at 530 is possible. For example, the scene Meet the Products 625d as illustrated by the dotted fill in FIG. 7-1 is selected by a customer. Processor/controller 416 accesses the scene Meet the Products 625d at block 532 and instructs that the digital media content of the selected scene be played on display screen 606 at block 534. In FIGS. 7-2 through 7-11, text is rendered on display screen 606 in the upper left corner describing the scene or vignette selected. Meet the Products 625d (as shown as being selected in FIG. 7-1) is a scene or vignette that describes all of the different smart products 608a-608f arranged in display setting 640 and not just particular smart products that are interconnected to address a certain type of scenario. As illustrated in FIG. 7-2, the digital media content of the selected scene or vignette Meet the Products 625d is displayed on display screen 606 and begins proceeding forward in time.

In FIG. 7-2, a balloon 709a is rendered on display screen 606 to point at a Smart Scale 608a, which is one of the smart products on display, and includes associated text introducing itself. A label 611a for Smart Scale 608a is rendered directly above Smart Scale 608a on display screen 606 and a halo of light 613a is rendered directly behind and around Smart Scale 608a on display screen 606. As illustrated in FIG. 7-3, balloon 709a disappears and is replaced by another balloon 809a pointing to Smart Scale 608a and includes associated text describing the product. In this embodiment, the associated text includes a description that Smart Scale 608a measures and remembers weight and body mass index for up to eight people.

Balloon 809a, label 611a and halo of light 613a disappear and as illustrated in FIG. 7-4, a balloon 709b is rendered on display screen 606 to point at a Smart Monitor 608b, which is one of the smart products on display, and includes associated text introducing itself. Also rendered on display screen 606 is a label 611b for Smart Monitor 608b located directly above Smart Monitor 608b and a halo of light 613b located directly behind and around Smart Monitor 608b. As illustrated in FIG. 7-5, balloon 709b disappears and is replaced by another balloon 809b pointing to Smart Monitor 608b and includes associated text describing the product. In this embodiment, the associated text includes a description that Smart Monitor 608b can take your blood pressure and upload your readings to a doctor's or family member's computing device.

Balloon 809b, label 611b and halo of light 613b disappear and as illustrated in FIG. 7-6, a balloon 709c is rendered on display screen 606 to point at Smart Light 608c and includes associated text introducing itself. Also rendered on display screen 606 is label 611c for Smart Light 608c located directly above Smart Light 608c and halo of light 613b located directly behind and around Smart Light 608c. In addition, processor/controller 416 instructs Smart Light 608c to turn on as is shown in FIG. 7-6 by the ray lines emanating from Smart Light 608c as realized in block 536 of flow diagram 528. As illustrated in FIG. 7-7, balloon 709c disappears and is replaced by another balloon 809c pointing to Smart Light 608c and includes associated text describing the product. In this embodiment, the associated text includes a description that Smart Light 608c can be dimmed on command or its 16.7 million colors can be programmed.

Figures 7, 8:
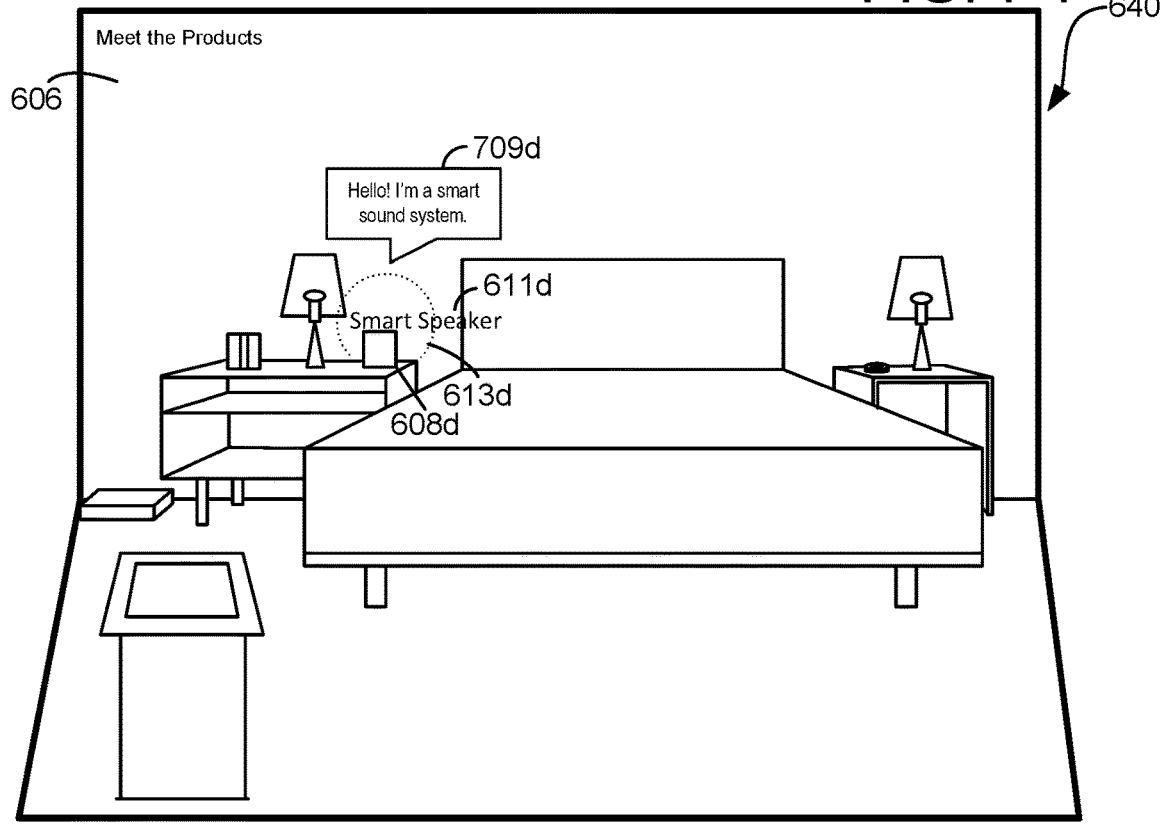
Figures 7, 8, 9:
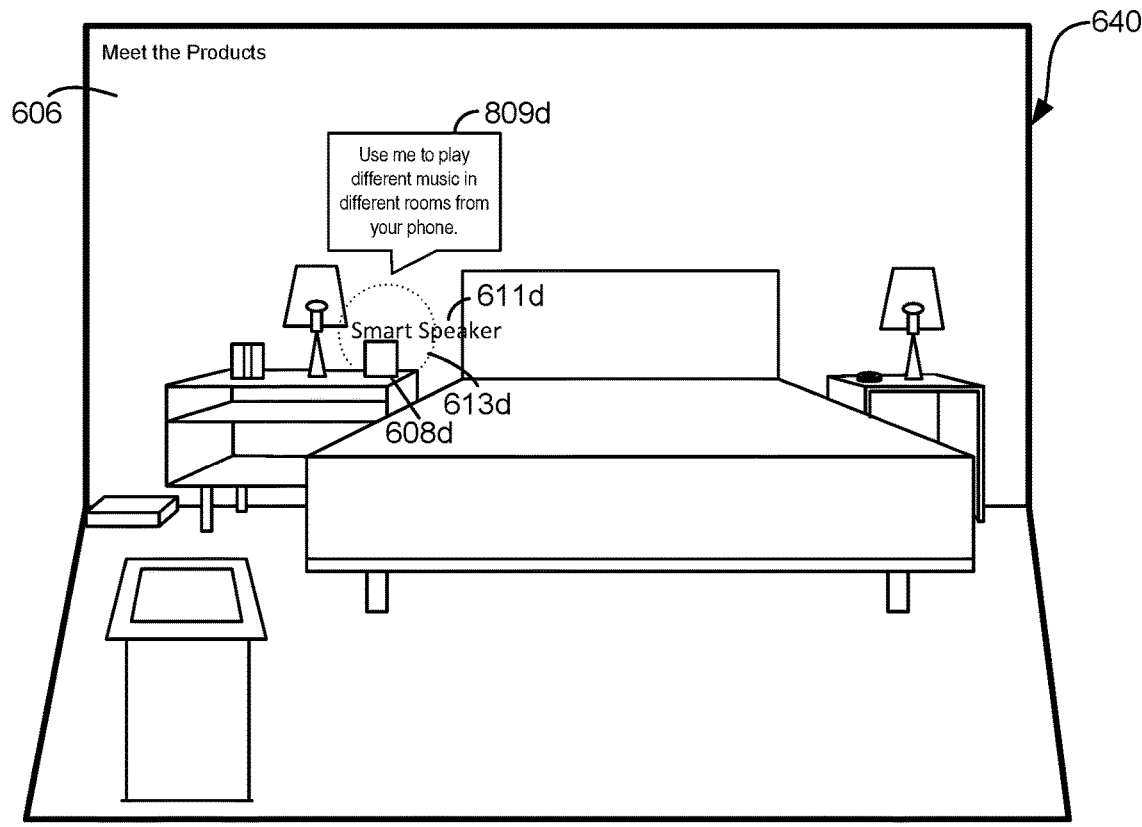
Figures 7, 8, 9, 10:
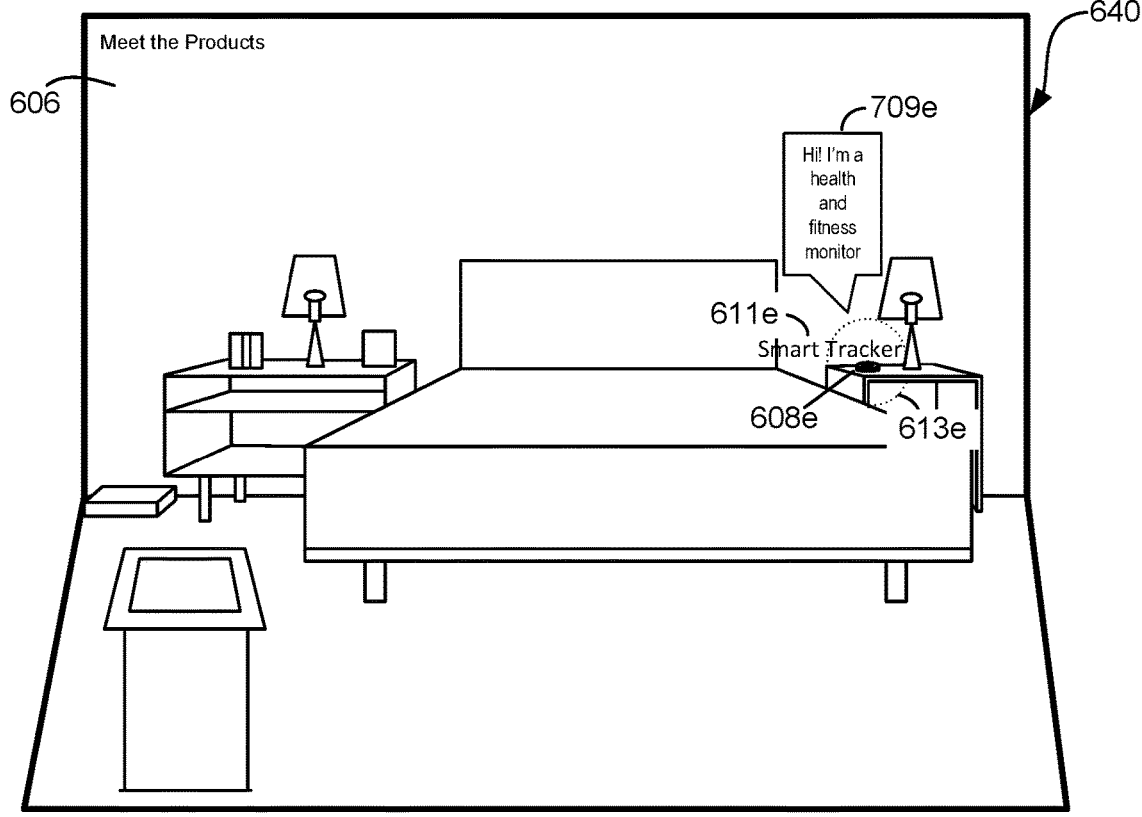
Figures 7, 8, 9, 10, 11:
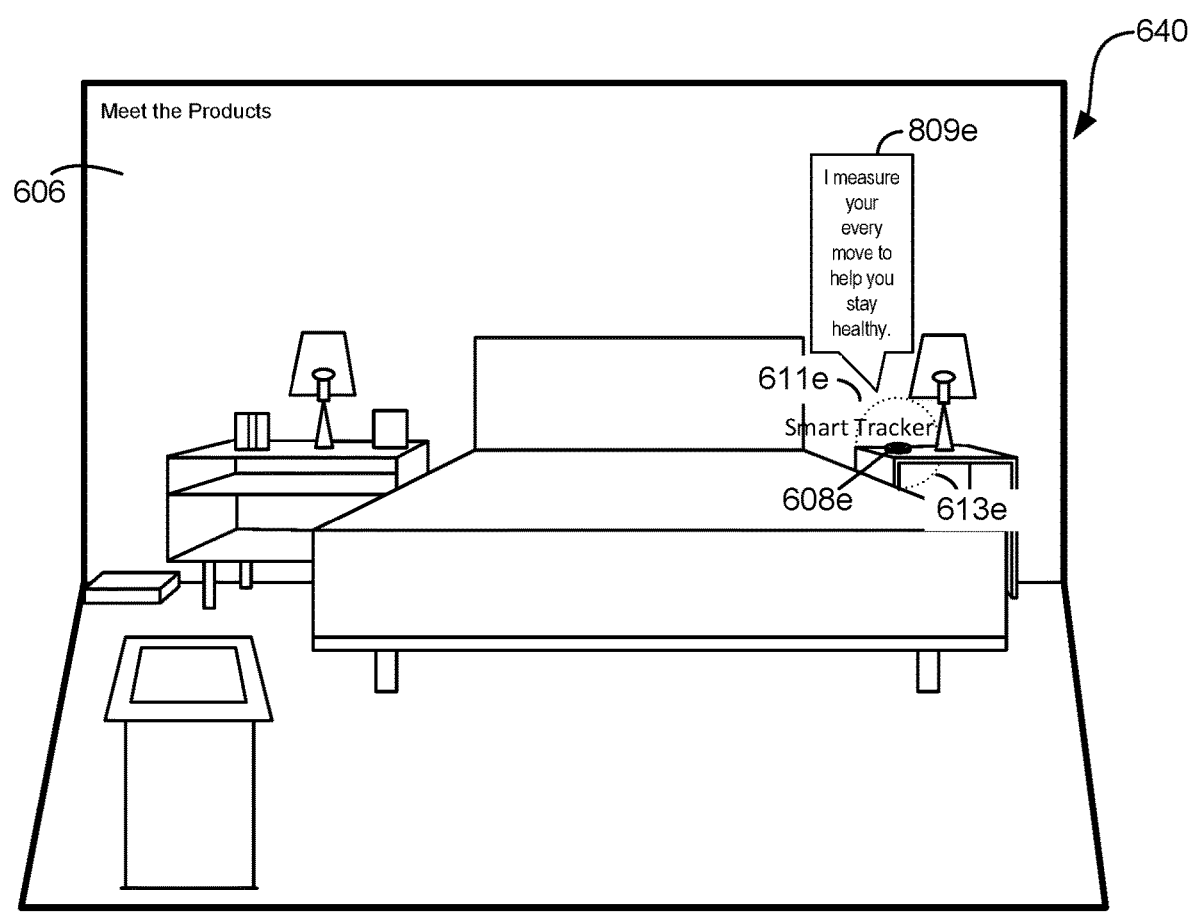

Balloon 809c, label 611c and halo of light 613c disappear, while processor/controller 416 instructs Smart Light 608c to turn off as also realized in block 536 of flow diagram 528. As illustrated in FIG. 7-8, a balloon 709d is rendered on display screen 606 to point at Smart Speaker 608d and includes associated text introducing itself. Also rendered on display screen 606 is label 611d for Smart Speaker 608d located directly above Smart Speaker 608d and halo of light 613d located directly behind and around Smart Speaker 608d. As illustrated in FIG. 7-9, balloon 709d disappears and is replaced by another balloon 809d pointing to Smart Speaker 608d and includes associated text describing the product. In this embodiment, the associated text includes a description that Smart Speaker 608d can used to play different music in different rooms from a smartphone.

Balloon 809d, label 611d and halo of light 613d disappear and as illustrated in FIG. 7-10, a balloon 709e is rendered on display screen 606 to point at Smart Tracker 608e and includes associated text introducing itself. Also rendered on display screen 606 is label 611d for Smart Tracker 608e located directly above Smart Tracker 608e and halo of light 613e located directly behind and around Smart Tracker 608e. As illustrated in FIG. 7-11, balloon 709e disappears and is replaced by another balloon 809e pointing to Smart Tracker 608e and includes associated text describing the product. In this embodiment, the associated text includes a description that Smart Tracker 608e can measure a person's every move to help a person stay healthy. The scene ends at block 538.

Although elements have been shown or described as separate embodiments above, portions of each embodiment may be combined with all or part of other embodiments described above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A display system comprising:
an input device;
a display screen located in a retail store;
a plurality of smart products that are on physical display in the retail store, wherein a first smart product is positioned directly in front of, relative to and adjacent a first location on the display screen and is available for purchase and a second smart product is positioned directly in front of, relative to and adjacent a second location on the display screen and is available for purchase;
a processor coupled to the input device and configured to receive an indication from the input device to instruct the display screen to play digital media content, wherein the digital media content includes a sequence of frames of digital images including frames of a first text balloon rendered near the first location on the display screen that corresponds with the first smart product, frames of a line that extends from the first location to the second location on the display screen that corresponds with the second smart product and frames of a second text balloon rendered near the second location on the display screen, wherein the first text balloon describes information related to functions of the first smart product and the second text balloon describes information related to functions of the second smart product; and
wherein the line illustrates that the information related to functions described in the first text balloon that corresponds to the first smart product are configured to trigger the information related to functions described in the second text balloon that corresponds to the second smart product.

2. The display system of claim 1, wherein the line is a curved line.

3. The display system of claim 1, wherein the sequence of frames of digital images further comprise frames that produce a halo of light on the display screen at each of the first and the second locations and behind each smart product as the information related to functions of each smart product are being described by its corresponding text balloon.

4. The display system of claim 1, further comprising a data store that contains the digital media content and timing instructions, wherein the processor is further coupled to at least one of the plurality of smart products on display so that while the digital media content is played on the display screen, the processor activates or deactivates a tangible function on at least one of the plurality of smart products based on the timing instructions, the tangible function being a function perceivable by one or more senses of the customer.

5. The display system of claim 4, wherein the tangible function comprises a light.

6. The display system of claim 1, wherein the plurality of smart products are each physically displayed on a display table using a placement mount so each smart product is fixed to the display table at their set location relative to the display screen.

7. The display system of claim 1, wherein the plurality of smart products are arranged in a display setting containing furnishings to exemplify a room in a house.

8. The display system of claim 1, wherein the input device comprises a graphical user interface that displays a plurality of selectable scenes.

9. The display system of claim 8, wherein the indication received by the processor from the input device comprises that one of the plurality of selectable scenes displayed on the graphical user interface of the input device has been selected and the processor is to instruct the display screen to play the digital media content indicative of the selected one of the plurality of selectable scenes.

10. A display system comprising:
a plurality of smart products arranged in a physical display setting in a retail store and being available for purchased by a customer, wherein the plurality of smart products include a first smart product and a second smart product;
a display screen separate from the plurality of smart products and located directly behind the plurality of smart products, the display screen having a first location located directly behind the first smart product and a second location located directly behind;
an input device located in the physical display setting with the plurality of smart products and the display screen; and
a controller coupled to the input device and to the display screen and configured to receive an indication from the input device to instruct digital media content to be displayed on the display screen, wherein the digital media content includes a sequence of frames of digital images including frames of a first text balloon rendered at or near the first location on the display screen that corresponds with the first smart product, frames of a line that extends from the first location to the second location on the display screen and frames of a second text balloon rendered at or near the second location on the display screen that corresponds with the second smart product, wherein the first text balloon describes information related to functional features of the first smart product, wherein the second text balloon describes information related to functional features of the second smart product and wherein the line illustrates that the functional features described in the first text balloon that correspond to the first smart product are configured to prompts the second smart product to perform the functional features described in the second text balloon that correspond to the second smart product.

11. The display system of claim 10, wherein the physical display setting contains furnishings to exemplify a room in a house.

12. The display system of claim 10, wherein the display setting comprises a display table where each smart product is physically fixed to the display table with a placement mount.

13. The display system of claim 10, wherein the sequence of frames of digital images that describe information related to functional features of at least the first smart product and the second smart product comprise a first text balloon rendered at or near the first location on the display screen that corresponds with the first smart product, a line that extends from the first location to the second location on the display screen and a second text balloon rendered at or near the second location on the display screen, wherein the first text balloon describes information related to functions of the first smart product, the line illustrates that the first smart product and the second smart product are interconnected and the second text balloon describes information related to functions of the second smart product.

14. The display system of claim 10, wherein the sequence of frames of digital images further comprise select frames that produce a halo of light behind each of the first smart product and the second smart product on physical display in front of the display screen when information related to functional features of each of the first smart product and the second smart product is being described in the sequence of frames of digital images.

15. The display system of claim 10, wherein while the digital media content is being played on the display screen and progressing forward in time, the controller activates or deactivates a tangible function on at least one of the first smart product and the second smart product when being described and based on timing instructions, the tangible function being a function perceivable by one or more senses of the customer.

16. A method of displaying media content on a display screen comprising:
receiving, by a processor, an indication from an input device to instruct the display screen to play digital media content, the display screen being located directly behind a plurality of smart products including the display screen having a first location located directly behind a first smart product and a second location located directly behind a second smart product;
instructing, by the processor, that the digital media content be played on the display screen located in a retail store, wherein the digital media content includes a sequence of frames of digital images including frames of a first text balloon rendered at or near the first location on the display screen that corresponds with the first smart product, frames of a line that extends from the first location to the second location on the display screen and frames of a second text balloon rendered at or near the second location on the display screen that corresponds with the second smart product, wherein the first text balloon describes information related to functions of the first smart product and the second text balloon describes information related to functions of the second smart product; and
wherein the line illustrates that the described functions in the first text balloon that correspond to functions of the first smart product are configured to trigger the described functions in the second text balloon that correspond to functions of the second smart product.

17. The method of claim 16, wherein the indication from the input device to instruct the display screen to play digital media content comprises the indication that one of a plurality of vignettes has been selected and further comprising accessing, by the processor, the selected one of the plurality of vignettes from a data store and wherein instructing, by the processor, comprises instructing that the digital media content of the selected vignette be played on the display screen.

18. The method of claim 16, further comprising accessing timing instructions so that while the digital media content is played on the display screen and progressing forward in time, the processor activates or deactivates a tangible function on at least one of the first smart product and the second smart product when being described and based on the timing instructions, the tangible function being a function perceivable by one or more senses of the customer.

19. The method of claim 16, wherein the sequence of frames of digital images further comprise select frames that produce a halo of light behind each of the first smart product and the second smart product on physical display in front of the display screen when information related to functional features of each of the first smart product and the second product is being described in the sequence of frames of digital images.

* * * * *